United States Patent
Nakamura

(10) Patent No.: US 12,322,190 B2
(45) Date of Patent: Jun. 3, 2025

(54) INFORMATION PROCESSING DEVICE, INFORMATION PROCESSING METHOD, AND INFORMATION PROCESSING PROGRAM

(71) Applicant: Nissan Motor Co., Ltd., Kanagawa (JP)

(72) Inventor: Mitsunori Nakamura, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 448 days.

(21) Appl. No.: 17/626,740

(22) PCT Filed: Jul. 12, 2019

(86) PCT No.: PCT/IB2019/000872
§ 371 (c)(1),
(2) Date: Jan. 12, 2022

(87) PCT Pub. No.: WO2021/009534
PCT Pub. Date: Jan. 21, 2021

(65) Prior Publication Data
US 2022/0262128 A1    Aug. 18, 2022

(51) Int. Cl.
*G06V 20/58*    (2022.01)
*B60W 30/095*    (2012.01)

(52) U.S. Cl.
CPC ........... *G06V 20/58* (2022.01); *B60W 30/095* (2013.01); *B60W 2554/4048* (2020.02); *B60W 2554/4049* (2020.02)

(58) Field of Classification Search
CPC ................ G06V 20/58; B60W 30/095; B60W 2554/4048; B60W 2554/4049
See application file for complete search history.

(56) References Cited

U.S. PATENT DOCUMENTS

| 10,518,769 B2 * | 12/2019 | Sen ................. G08G 1/163 |
| 2007/0016372 A1 * | 1/2007 | Browne ............. G01C 21/005 |
| | | 701/469 |

(Continued)

FOREIGN PATENT DOCUMENTS

| CN | 101632109 A | 1/2010 |
| CN | 108447302 A | 8/2018 |

(Continued)

OTHER PUBLICATIONS

Li, F., Zhang, R. and You, F. (2017), Fast pedestrian detection and dynamic tracking for intelligent vehicles within V2V cooperative environment. IET Image Processing, 11: 833-840. https://doi.org/10.1049/iet-ipr.2016.0931 (Year: 2017).*

(Continued)

*Primary Examiner* — Stephen R Koziol
*Assistant Examiner* — Ashley L. Hytrek
(74) *Attorney, Agent, or Firm* — Osha Bergman Watanabe & Burton

(57) ABSTRACT

In an information processing device, a first viewpoint object detecting unit detects an object in a first viewpoint, and an area setting unit sets a predetermined blind spot area among blind spot areas where objects are not able to be detected as a priority area based on detection results of detecting the object. Further, a second viewpoint object detecting unit detects the object in a second viewpoint, and an object selection unit selects the object in an area where the object can be newly detected in the second viewpoint within the priority area where the object could not be detected in the first viewpoint.

28 Claims, 19 Drawing Sheets

(56) References Cited

U.S. PATENT DOCUMENTS

| | | | | |
|---|---|---|---|---|
| 2010/0099353 A1* | 4/2010 | Komori | | G08G 1/096791 |
| | | | | 455/39 |
| 2017/0334441 A1 | 11/2017 | Sen et al. | | |
| 2018/0233049 A1* | 8/2018 | Ishii | | G08G 1/162 |
| 2022/0176952 A1* | 6/2022 | Nanri | | B60W 30/0956 |

FOREIGN PATENT DOCUMENTS

| | | | | |
|---|---|---|---|---|
| CN | 110962744 A | * | 4/2020 | |
| JP | 2008-225786 A | | 9/2008 | |
| JP | 2008-299676 A | | 12/2008 | |
| JP | 2017-207967 A | | 11/2017 | |
| JP | 2018-133072 A | | 8/2018 | |
| WO | WO-2018189913 A1 | * | 10/2018 | |

OTHER PUBLICATIONS

R. Fukatsu and K. Sakaguchi, "Millimeter-Wave V2V Communications with Cooperative Perception for Automated Driving," 2019 IEEE 89th Vehicular Technology Conference (VTC2019-Spring), Kuala Lumpur, Malaysia, 2019, pp. 1-5, doi: 10.1109/VTCSpring. 2019.8746344. (Year: 2019).*

\* cited by examiner

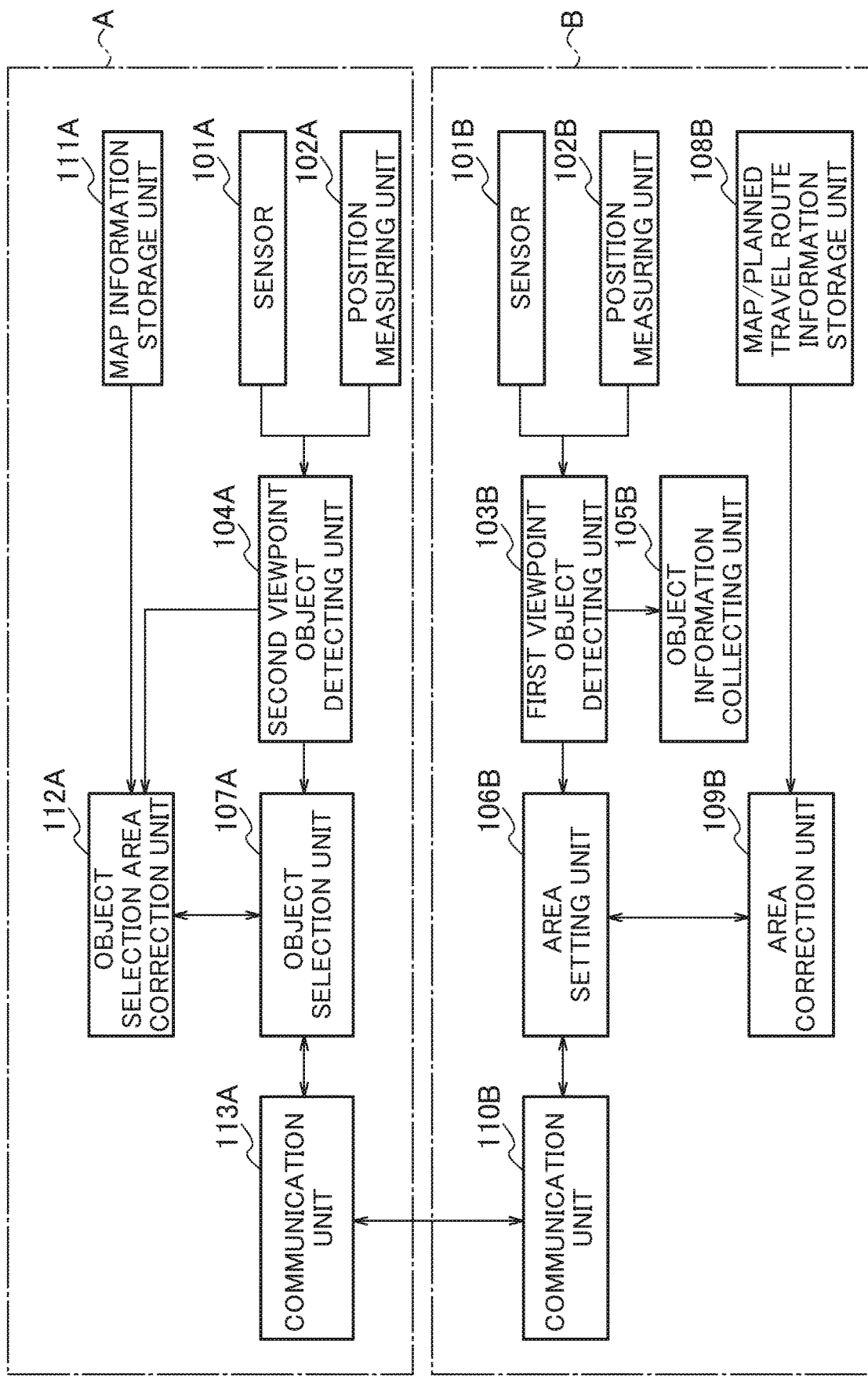

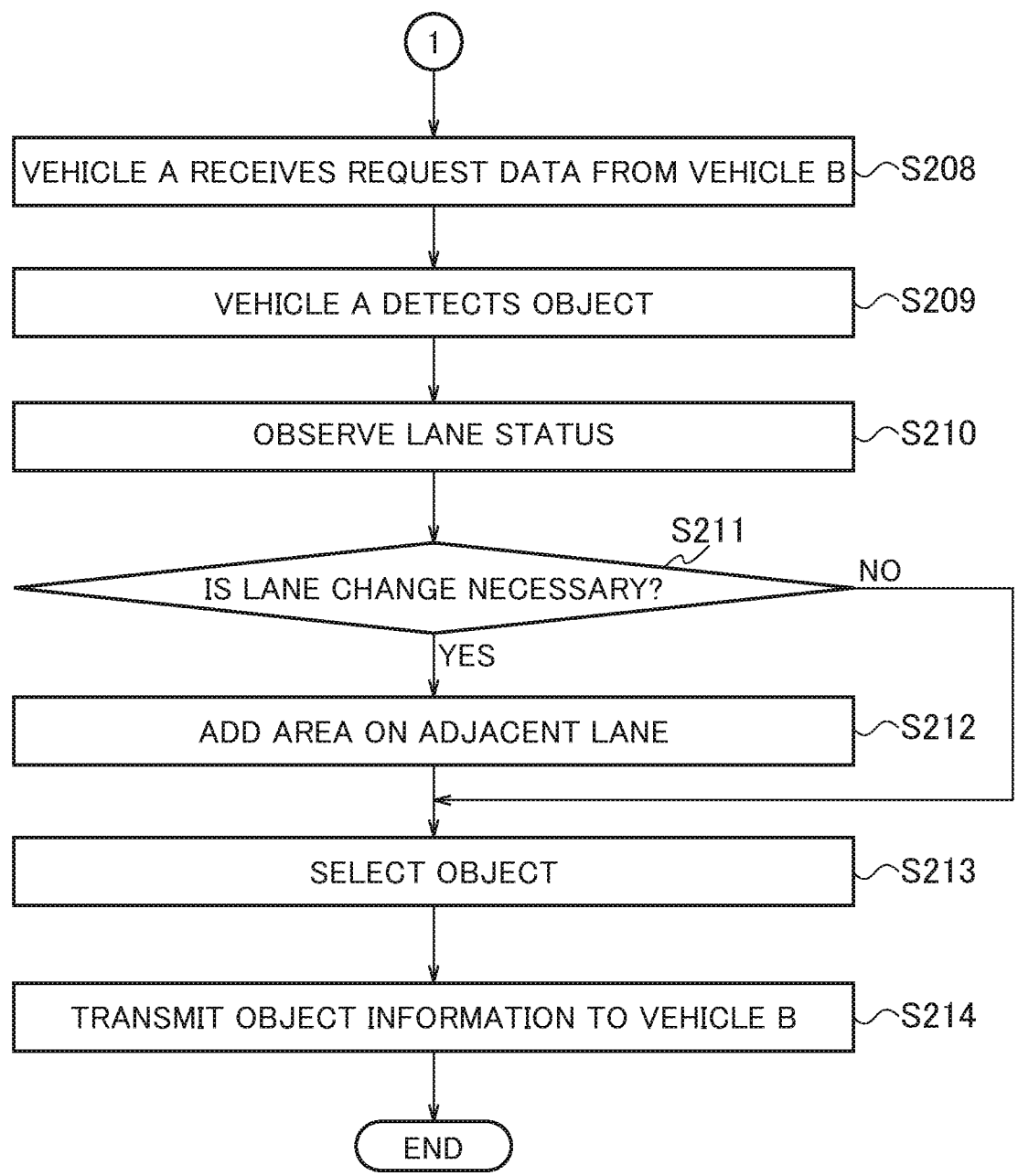

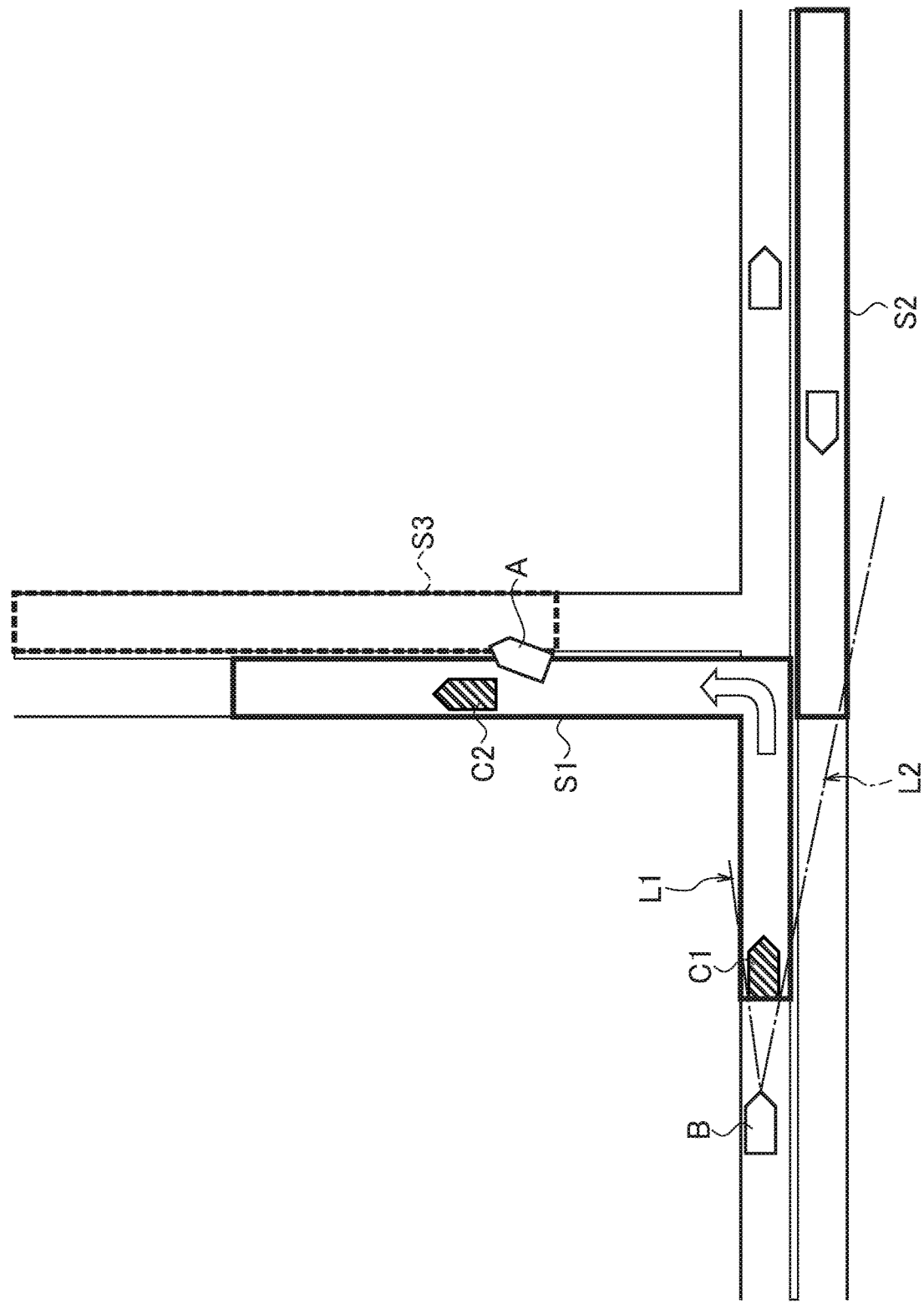

INFORMATION PROCESSING DEVICE, INFORMATION PROCESSING METHOD, AND INFORMATION PROCESSING PROGRAM

TECHNICAL FIELD

The present invention relates to an information processing technology. In particular, the present invention relates to a technology for setting an area where a vehicle performs sensing and distributing object information in the area.

BACKGROUND ART

Patent Literature 1 discloses a method of requesting, to another vehicle, information on a blind spot range that is a blind spot area for a host-vehicle and receiving, from another vehicle, image information corresponding to the blind spot range.

CITATION LIST

Patent Literature

Patent Literature 1. Japanese Unexamined Patent Application Publication No. 2008-299676

SUMMARY OF THE INVENTION

Problems to be Solved by the Invention

However, the information on the blind spot range is randomly requested to another vehicle, and the image information corresponding to the blind spot range is indiscriminately received. Therefore, it is not possible to determine whether the image information is blind spot area information useful for a driver of the host-vehicle or an automatic driving system, until all pieces of image information are received.

The present invention is made in view of the above described problems, and an object of the present invention is to efficiently acquire information useful for a driver or an automatic driving system.

Means for Solving the Problem

In order to solve the above described problems, an information processing device, an information processing method, and an information processing program according to the present invention set a predetermined area, among areas where objects are not able to be detected, as a priority area, and request, to a vehicle, object information included in the priority area.

Advantageous Effect of the Invention

According to the present invention, it is possible to efficiently acquire information useful for a driver or an automatic driving system.

BRIEF DESCRIPTION OF THE DRAWINGS

FIG. 6 shows constitutions of vehicles A and B according to a second embodiment.

FIG. 7B is a flowchart showing process procedures of an information processing method.

FIG. 8 is a supplementary view for explaining processes shown in FIGS. 7A and 7B.

MODES FOR CARRYING OUT THE INVENTION

Summary

First, a vehicle travelling on a road performs a process of detecting an object, and sets, as a priority area, a predetermined blind spot area, among blind spot areas where the object is not able to be detected. For example, the vehicle sets, as the priority area, each of a lane and a road on a planned travel route, which are shielded by a preceding vehicle and a lane that crosses the planned travel route. Thereafter, in order to request pieces of information on objects present in the two priority areas, the vehicle transmits request data to neighboring vehicles by using known V2X (Vehicle to Everything) communications.

If another vehicle capable of performing V2X communications is present in the priority area, another vehicle preferentially detects objects present in the priority area, among objects present in all areas that are able to be detected by another vehicle, after another vehicle receives the request data. In addition, even if an area is not the priority area, if there is a possibility that another vehicle is not able to travel along a planned travel route of another vehicle due to a parked vehicle or the like, the requesting vehicle may also change the planned travel route in the near future. Therefore, another vehicle enhances the priority of a non-priority area related to a route after the change among the all areas to set the non-priority area as a further priority area (an extension area), and preferentially detects objects present in the further priority area also. For example, another vehicle adds an adjacent lane that is adjacent to the travelling lane as the further priority area, in addition to a travelling lane corresponding to the requested priority area.

In order to preferentially transmit pieces of information on objects detected in both of the requested priority area and the added further priority area (an extension area), another vehicle transmits, to the requesting vehicle, distribution order information in which a lane link ID corresponding to the requested priority area and a lane link ID corresponding to the further priority area are set as a first lane link ID and a second lane link ID respectively, and lane link IDs corresponding to non-priority areas other than each of the priority areas are set as third or later lane link IDs. Thereafter, another vehicle transmits pieces of information on objects present in each of the priority areas and the non-priority areas individually to the requesting vehicle in the distribution order set in the distribution order information.

This enables the efficient acquisition of information useful for a driver or the automatic driving system.

First Embodiment

A first embodiment applied with the present invention will be described.
[Constitutions of Vehicle and Information Processing Device]

Figure 1:
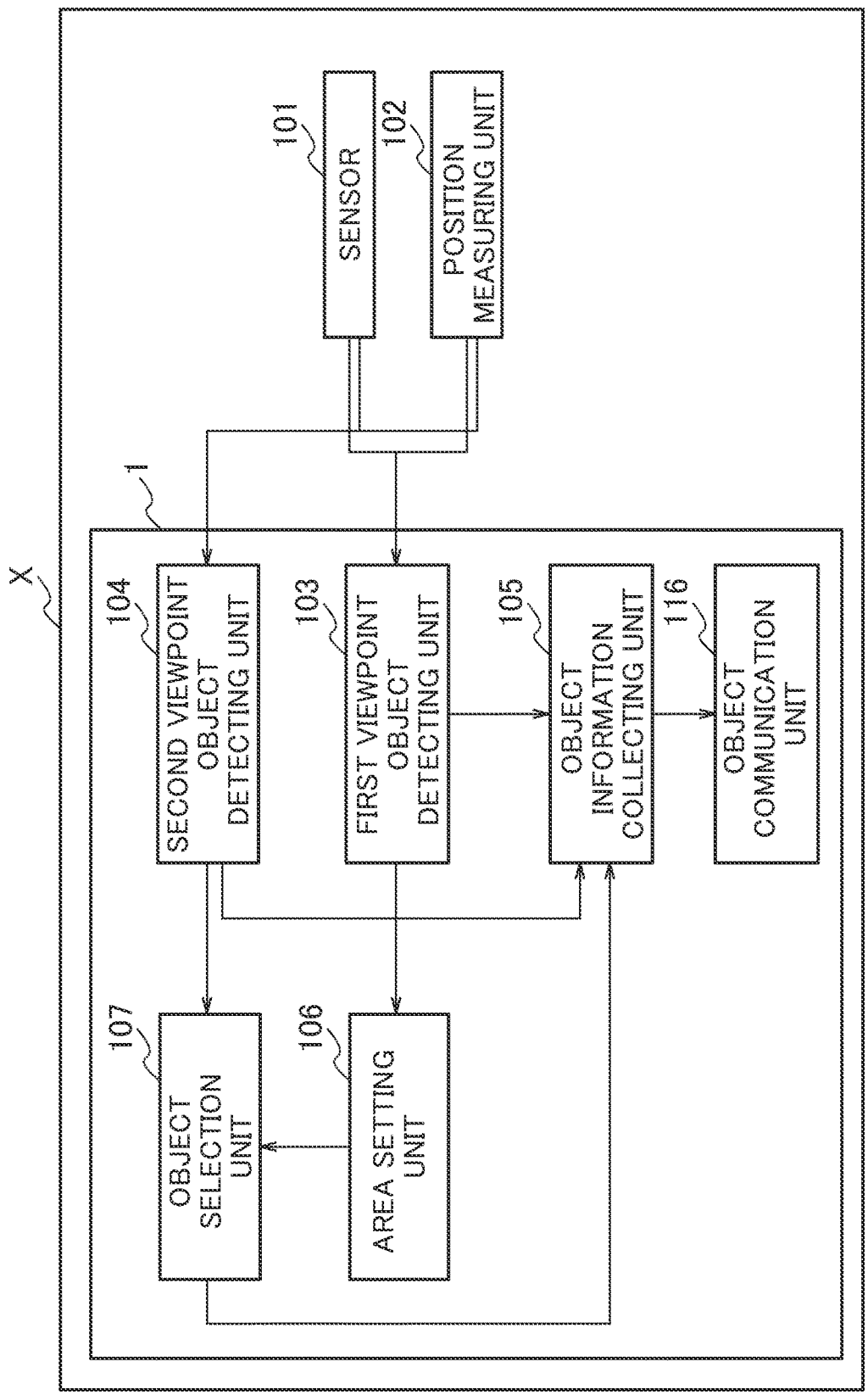
FIG. 1 is a diagram showing a constitution of a vehicle X according to a first embodiment.

FIG. 1 is a diagram showing a constitution of a vehicle X according to a first embodiment. The vehicle X mainly includes a sensor 101, a position measuring unit 102, a first viewpoint object detecting unit 103, a second viewpoint object detecting unit 104, an object information collecting unit 105, an area setting unit 106, an object selection unit 107, and an object communication unit 116.

As shown in FIG. 1, the information processing device 1 mainly includes the first viewpoint object detecting unit 103, the second viewpoint object detecting unit 104, the object information collecting unit 105, the area setting unit 106, the object selection unit 107, and the object communication unit 116.

The sensor 101 is mounted to an inner part, an outer part, an upper part, side parts and the like of the vehicle X, and has a function of measuring a distance to an object that is present around the vehicle X, a direction of the object, and the like. The sensor 101 also has a function of outputting the measured distance, direction, and the like of the object in association with a current time transmitted from the position measuring unit 102.

For example, the sensor 101 is a laser range finder and a visible light camera. The laser range finder irradiates, with near-infrared light, an object around a road which is positioned about 150 m ahead in a 360-degree orientation range, and measures the intensity of a response wave, a distance to the object, and a direction of the object, based on a response time until the reception of the response wave and the like. Then, the laser range finder outputs, for example, raw data of a point cloud format (the intensity, distance, and direction) in which, 0.25-degree orientation is set as a unit point, and unit points for 180-degree orientation are collected. The visible light camera outputs image data obtained by photographing space around the road. The laser range finder has a feature of high position measurement accuracy, and the visible light camera has a feature of being able to recognize a figure, a character, a color and the like on the road, in addition to a position of the object by combining recognition processes such as machine learning.

The position measuring unit 102 has a function of measuring the current position of the vehicle X, and outputting the measured current position in association with the current time. For example, the position measuring unit 102 is a position measuring device and a three-dimensional position measuring system.

The first viewpoint object detecting unit 103 has a function of calculating a position of the object relative to the vehicle X in a first viewpoint of the vehicle X by using measurement data (the distance, direction and the like of the object) obtained by the measurement by the sensor 101, and calculating an absolute position of the object on the map by using measurement data (position information on the vehicle X) obtained by the measurement by the position measuring unit 102. A coordinate system of the absolute position is expressed by a travel distance or the like from a predetermined reference point located at an intersection or the like on a high-precision map, such as a world geodetic system.

This causes the first viewpoint object detecting unit 103 to detect the object present on the road at the current time. Then, the first viewpoint object detecting unit 103 outputs detection results of the object to the object information collecting unit 105, and the area setting unit 106. If the sensor 101 has also measured a type, a speed, or the like of the object, the first viewpoint object detecting unit 103 also outputs information on the type, speed or the like together with the detection result.

As similar as the first viewpoint object detecting unit 103, the second viewpoint object detecting unit 104 detects the object presenting on the road at the current time in a second viewpoint of the vehicle X, and outputs the detection result of the object to the object information collecting unit 105, and the object selection unit 107. At this time, the second viewpoint object detecting unit 104 uses a viewpoint different from the first viewpoint, for example, and thus, uses measurement data obtained by the measurement by a sensor located at a position different from that of the sensor 101, measurement data obtained by the measurement by a sensor in a sensor principal axis direction different from that of the sensor 101, and measurement data obtained by the measurement at different time, if the same sensor 101 is used.

The object information collecting unit 105 has a function of collecting and storing detection results of the objects detected by the first viewpoint object detecting unit 103, and the second viewpoint object detecting unit 104 individually in association with detection times.

The object communication unit 116 has a function of transmitting and receiving data to and from a vehicle or various servers via a predetermined communication network. For example, the object communication unit 116 transmits, to another vehicle and various servers, the detection result and the like of the object stored in the object information collecting unit 105. Further, the object communication unit 116 receives the detection result and the like of the object transmitted from another vehicle and various servers, to transmit the detection result to the object information collecting unit 105.

The predetermined communication network is, for example, a communication network based on DSRC (Dedicated Short Range Communications) system in accordance with IEEE (Institute of Electrical and Electronics Engineers) 802.11p, and a wireless communication network based on LTE (Long Term Evolution) cellular V2X system in accordance with 3GPP (Release 14). An existing communication network and any communication network that is usable in the future (for example, a next-generation mobile communication network and the like such as 5G) are usable, in addition to a specific type of communication network. Further, a plurality of communication networks in which different kinds of communication networks are connected may be used, a wireless communication network may be used, or a wired communication network may be used.

The area setting unit 106 has a function of setting a predetermined area, in order to supplement, with another viewpoint information, an area that is not able to be detected by the first viewpoint object detecting unit 103 within a sensor view angle of the sensor 101. Specifically, the area setting unit 106 has a function of setting, as a priority area, a predetermined area among areas where objects are not able to be detected, based on the detection result of the object by the first viewpoint object detecting unit 103.

For example, the area setting unit 106 sets, as a priority area, a blind spot area useful for a driver of the vehicle X or an automatic driving system, among a plurality of blind spot areas shielded by an object in front of the vehicle X. Examples of the priority area include, for example, a forward traveling area and a forward intersection area shielded by a preceding vehicle. On the other hand, a backward area shielded by a backward vehicle is not set as the priority area.

The object selection unit 107 has a function of selecting an object in an area that can be newly detected in the second viewpoint within the priority area set by the area setting unit 106 by using the detection result of the object by the second viewpoint object detecting unit 104, and outputting information on the selected object preferentially to the object information collecting unit 105.

The object information is data of a detected object as a result of performing a process of detecting the object present in a predetermined area, and is the following data related to a predetermined object (for example, people, a vehicle (a standard-size vehicle, a large-size vehicle, a motorcycle, and the like), a bicycle, a road structure, a road obstacle, and the like) set in advance, and an object with a predetermined size or more.

For example, the object information is data indicating a geographical location of the detected object. Specifically, the location data is a position specified by the latitude and longitude, a position specified by a predetermined parameter (a node, a link, or the like) presenting on a road map, a position relative to a sensor or the like that has detected the object, and the like.

Further, the object information is data indicating a type of the detected object. For example, the data is information on a type such as a person, a vehicle (a standard-size vehicle, a large-size vehicle, a motorcycle, and the like), a bicycle, a road structure, a road obstacle, and the like. The object information is data indicating a size of the detected object (the length, width, height, and the like). The object information is still image data, video data, and point cloud data including the detected object. Further, the object information may include a speed, a detection time, an observation time and the like of the detected object.

The information processing device 1 further includes a monitoring sensor (not shown) for monitoring a side of the road, road boundary line detecting means (not shown), and stationary object area estimating means (not shown). The stationary object area estimating means has a function of detecting a road boundary line or a background object, detecting an object presenting on the road, obtaining an intersecting point between the detected object and a parting line based on the "detection result of the road boundary line or the background object" and the "detection result of the object presenting on the road" and detecting the vehicle or the obstacle by estimating and calculating a stationary object area.

After detecting the vehicle or the obstacle, the information processing device 1 displays the stationary object area with area information to a driving support system or the automatic driving system of the vehicle X and notifies the systems of the presence of the stationary object by using the sound. The area information includes, for example, GNSS (Global Navigation Satellite System) latitude and longitude coordinates and connection information, section information based on a lane ID and a travel distance of a high-precision map, a lane link ID, coordinate information, and the like.

[Hardware Constitutions of Vehicle and Information Processing Device]

Figure 2:
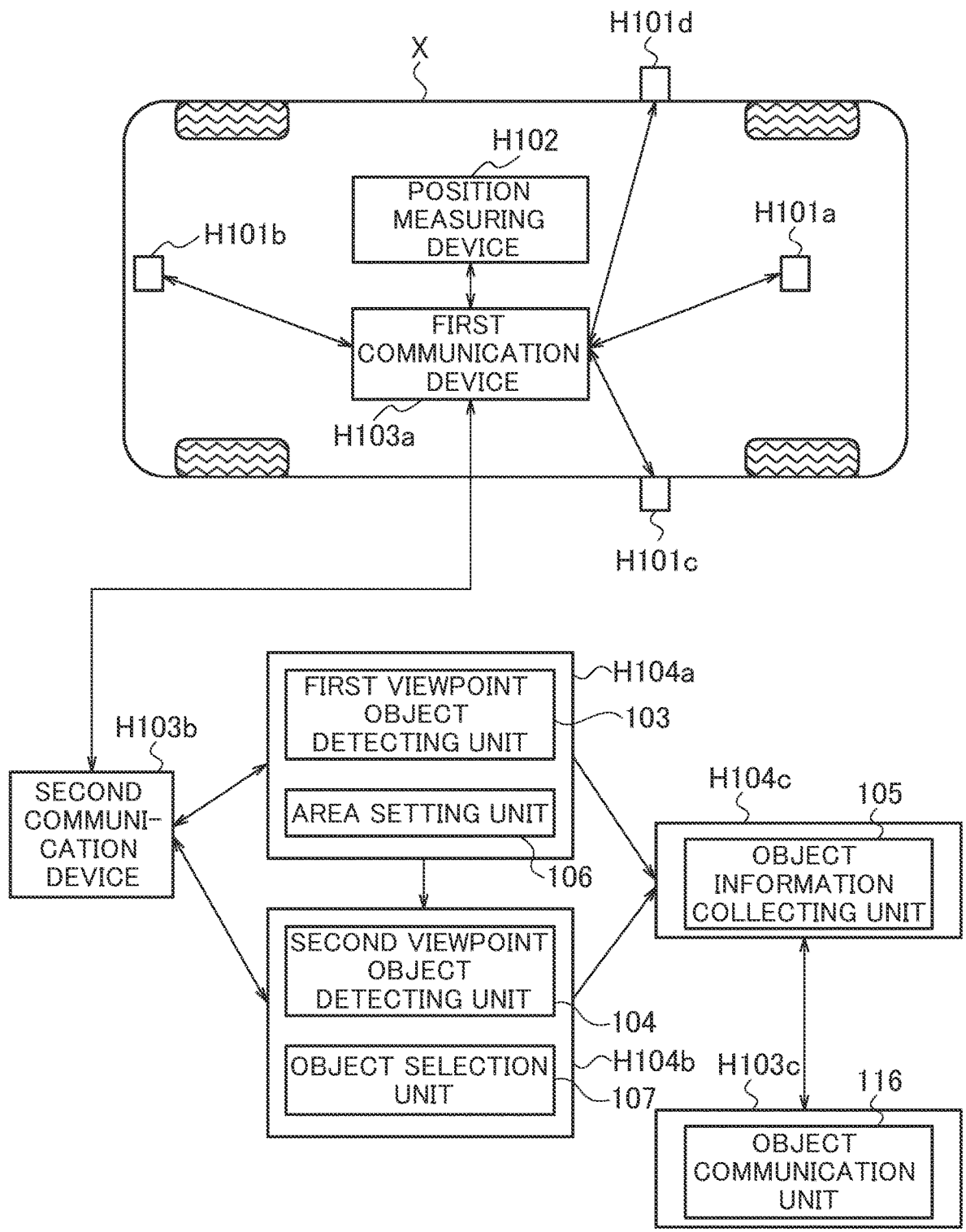
FIG. 2 is a diagram showing a hardware constitution of each of component units shown in FIG. 1.

FIG. 2 is a diagram showing a hardware constitution of each of component units shown in FIG. 1. Each of the component units includes, for example, a sensor device H101, a position measuring device H102, a communication device H103, and an arithmetic processing device H104.

The sensor device H101 is the sensor 101 shown in FIG. 1, and includes a front sensor H101a, a rear sensor H101b, a right sensor H101c, and a left sensor H101d.

The front sensor H101a is mounted with a 4K resolution camera and a lens with a field angle of 90 degrees in order to capture a visible image of space in front of the vehicle X. The camera of the front sensor H101a is disposed such that the center of the camera faces a traveling direction of the vehicle X, and outputs image data according to the detection result of the road boundary line by the road boundary line detecting means (not shown).

The rear sensor H101b is mounted with a camera and a lens as same as the front sensor H101a. The camera of the rear sensor H101b is disposed such that the center of the camera faces a direction 180 degrees rearward from the traveling direction of the vehicle X, and outputs image data captured at a timing closest to the image capture timing of the front sensor H101a according to the detection result of the road boundary line by the road boundary line detecting means (not shown).

The right sensor H101c is mounted with a 4K resolution camera and a lens with a field angle of 180 degrees, in order to capture a visible image of space on the right side of the vehicle X. The camera of the right sensor H101c is disposed such that the center of the camera faces 90 degrees to the right of the traveling direction of the vehicle X, and outputs image data captured at a timing closest to the image capture timing of the front sensor H101a according to the output from the road boundary line detecting means (not shown).

The left sensor H101d is mounted with the same camera and lens as the right sensor H101c. The camera of the left sensor H101d is disposed such that the center of the camera faces 90 degrees to the left of the traveling direction of the vehicle X, and outputs image data captured at a timing closest to the image capture timing of the front sensor H101a according to the output from the road boundary line detecting means (not shown).

The position measuring device H102 is the position measuring unit 102 shown in FIG. 1, and is mounted to a position inside the vehicle X, receives a GNSS signal from another device, and calculates the position and the traveling direction of the vehicle X at the current time.

The communication device H103 includes a first communication device H103a, a second communication device H103b, and a third communication device H103c. The first communication device H103a, and the second communication device H103b are used when the sensor 101 and the position measuring unit 102 shown in FIG. 1 are mounted on the vehicle X, and the information processing device 1 is mounted on an object other than the vehicle X. The third communication device H103c is used, when the information processing device 1 communicates with another vehicle and various servers. Each of the second communication device H103b and the third communication device H103c may be constituted by a single wireless communication circuit.

The first communication device H103a controls communication of data transmitted and received between the sensor 101 and the position measuring unit 102, and the information processing device 1. Specifically, the first communication device H103a distributes the current time of the position measuring device H102 to the sensor device H101, and transmits and receives data among a first arithmetic processing device H104a, a second arithmetic processing device H104b, and a third arithmetic processing device H104c via the second communication device H103b.

The second communication device H103b controls the communication of data transmitted and received between the information processing device 1, and the sensor 101 and the position measuring unit 102. Specifically, the second communication device H103b transmits and receives data to and from the sensor 101 and the position measuring unit 102 via the first communication device H103a.

The third communication device H103c controls the communication of data transmitted and received between the information processing device 1, and another vehicle and various servers. Specifically, the third communication device H103c includes the object communication unit 116, and transmits and receives data to and from another vehicle and various servers via a predetermined communication network.

The arithmetic processing device H104 includes a first arithmetic processing device H104a, a second arithmetic processing device H104b, and a third arithmetic processing device H104c.

The first arithmetic processing device H104a performs each of processes of the first viewpoint object detecting unit 103, and the area setting unit 106 based on pieces of data output from the sensor device H101, and the position measuring device H102. The first arithmetic processing device H104a transmits, to the third arithmetic processing device H104c, the detection result of the object by the first viewpoint object detecting unit 103, and transmits area setting information by the area setting unit 106 to the second arithmetic processing device H104b.

The second arithmetic processing device H104b performs each of processes of the second viewpoint object detecting unit 104 and the object selection unit 107 based on pieces of data output from the sensor device H101, the position measuring device H102, and the first arithmetic processing device H104a. Further, the second arithmetic processing device H104b transmits, to the third arithmetic processing device H104c, the detection result of the object by the second viewpoint object detecting unit 104 and the object information by the object selection unit 107.

The third arithmetic processing device H104c performs each process of the object information collecting unit 105 based on pieces of data output from the first arithmetic processing device H104a, and the second arithmetic processing device H104b. Further, the third arithmetic processing device H104c transmits data collected by the object information collecting unit 105 to another vehicle and various servers via the third communication device H103c that has the object communication unit 116. Still further, the third arithmetic processing device H104c receives detection results and the like of the object that are transmitted from another vehicle and various servers to the object communication unit 116 of the third communication device H103c, and outputs the detection results to the object information collecting unit 105.

The arithmetic processing device H104 can be realized by a computer having a CPU, a memory, a hard disk, an input/output interface, and the like. Further, the arithmetic processing device H104 can be mounted on a vehicle, a mobile phone terminal, a mobile edge computer on a mobile communication network, a road traffic facility server installed on a road side, a cloud server on the internet, and the like.

[Information Processing Method]

Figure 3:
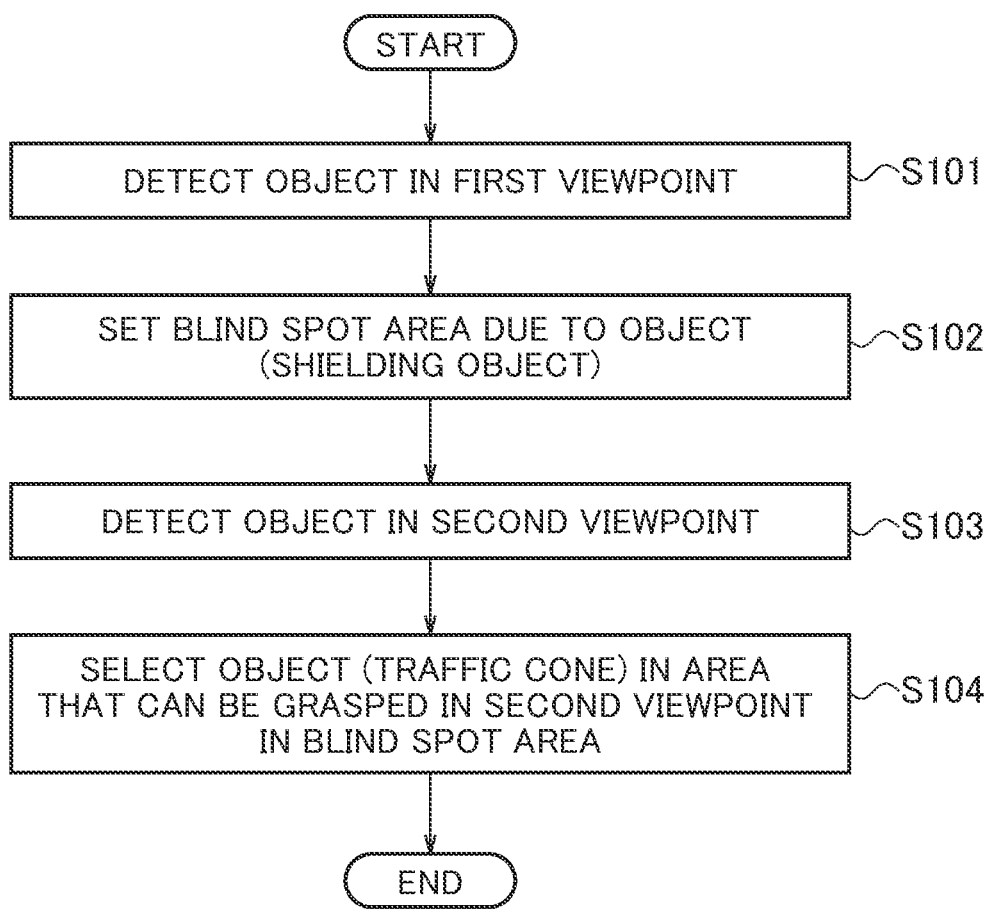
FIG. 3 is a flowchart showing process procedures of an information processing method.

Next, an information processing method performed by the information processing device 1 will be described. FIG. 3 is a flowchart showing process procedures of the information processing method.

First, preconditions will be described with reference to FIG. 4. In the first viewpoint shown in the upper side of FIG. 4, a shielding object O1 is present ahead of the vehicle X, and the vehicle X approaches the shielding object at a vehicle speed of 20 km/h. The shielding object O1 is immovable and occupies a part of a traveling road of the vehicle X.

Figure 4:
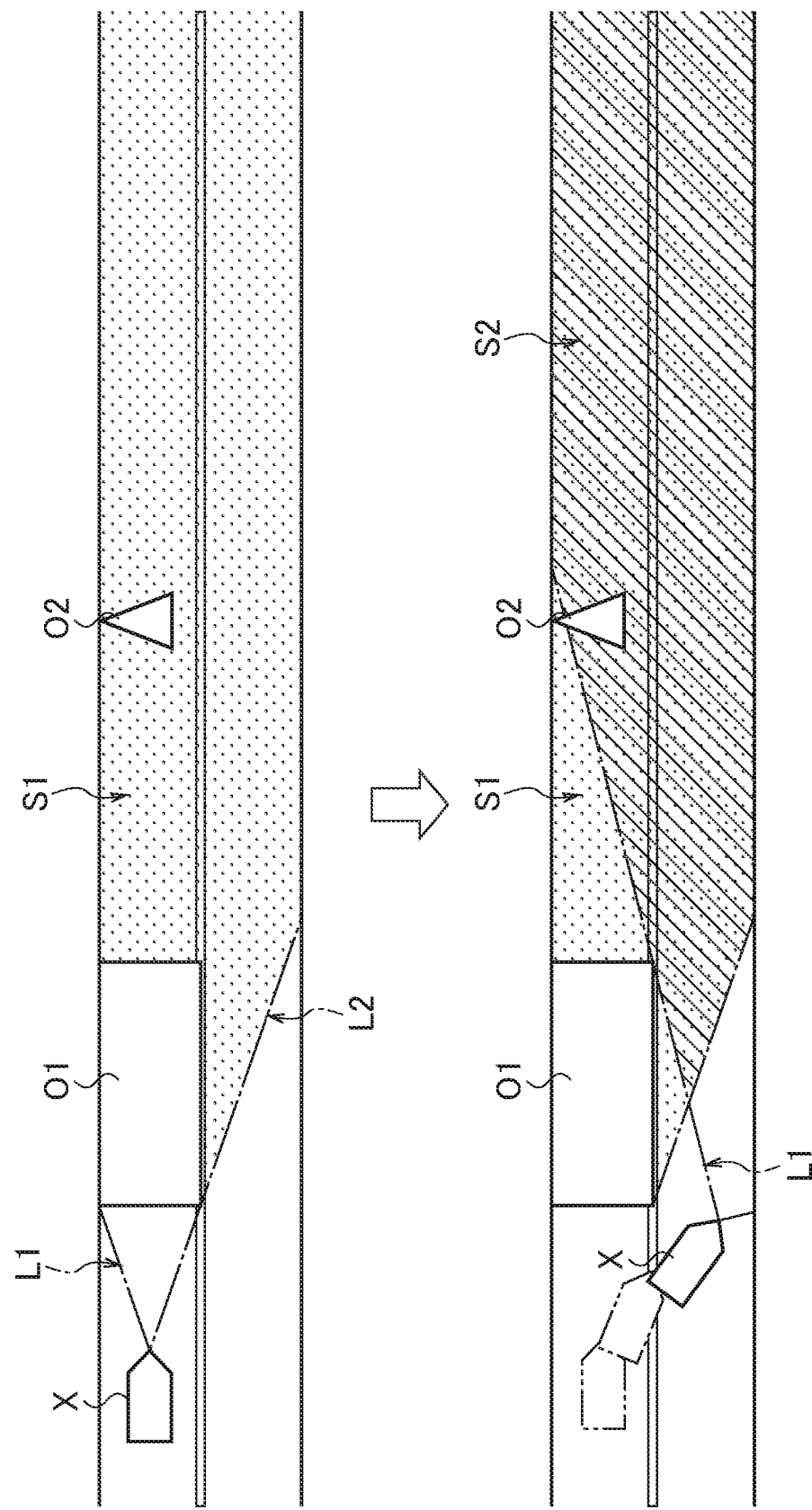
FIG. 4 is a supplementary view for explaining processes shown in FIG. 3.

Step S101;

First, the first viewpoint object detecting unit 103 detects the object in the first viewpoint shown in the upper side of FIG. 4. Thereafter, the first viewpoint object detecting unit 103 stores the detection result of the object in the object information collecting unit 105, and transmits the detection result of the object to the area setting unit 106. In the first viewpoint, the shielding object O1 is detected as an object.

Step S102;

Next, the area setting unit 106 sets, as a priority area, a predetermined blind spot area, among blind spot areas where the object is not able to be detected due to the presence of the shielding object O1, and transmits the priority area to the object selection unit 107. The area setting unit 106 sets, as a priority area, a predetermined area where object information is not able to be detected by a sensor of a host-vehicle due to the presence of a shielding object or the like. For example, as shown in the upper side of FIG. 4, the area setting unit 106 obtains an intersecting point between the shielding object O1 and each of the parting lines L1 and L2. Then, the area setting unit 106 sets, as a priority area S1, an area S1 which is behind the shielding object O1, and includes the shielding object O1 sandwiched between the parting lines L1 and L2.

Step S103;

Next, the second viewpoint object detecting unit 104 detects an object in a second viewpoint of the moved vehicle X as shown on the lower side of FIG. 4. Then, the second viewpoint object detecting unit 104 transmits the detection result of the object to the object information collecting unit 105, and to the object selection unit 107. In the second viewpoint, the second viewpoint object detecting unit 104 detects a traffic cone O2 as an object.

Step S104;

Finally, the object selection unit 107 defines an area S2 within a range where a road surrounded by a parting line L1 contacting the shielding object O1, and a right lane is visible, as a temporary shielded area S2 where the object information should be transmitted preferentially, which area becomes newly detectable and has been temporarily shielded in the first viewpoint. Then, the object selection unit 107 selects the traffic cone O2 in the temporary shielded area S2 which becomes newly detectable in the second viewpoint within the priority area S1 where the object is not able to be detected in the first viewpoint, and preferentially transmits the detection result to the object information collecting unit 105. For example, the object selection unit 107 transmits the object information on the traffic cone O2 first, and then transmits the object information on the shielding object O1.

The object selection unit 107 transmits, to the object information collecting unit 105, information indicating the temporary shielded area S2 where the object is not able to be detected in the first viewpoint and the object becomes newly detectable in the second viewpoint, together with the object information on the traffic cone O2. In other words, the object selection unit 107 transmits the area information on the temporary shielded area S2, in addition to the object information included in the temporary shielded area S2. For example, the object selection unit 107 transmits information indicating a geographical location of the temporary shielded area S2 and information indicating a geographical location of the second viewpoint in which the temporary shielded area S2 becomes detectable.

The object information on the traffic cone O2 is information on an object that is not able to be detected at a first position in the first viewpoint due to the shielding object O1 presenting in front of the vehicle X and is only detectable in the second viewpoint which is closer to the traffic cone O2 as the object than the first viewpoint (temporary shielded object information).

[Variation 1 of Step S104]

After the object selection unit 107 transmits the temporary shielded object information to the object information collecting unit 105 in the vehicle X, the object information collecting unit 105 can preferentially transmit the temporary shielded object information from the vehicle X to another vehicle and various servers via the object communication unit 116.

This enables even another vehicle not approaching the traffic cone O2 to detect the object in the temporary shielded object information in advance based on the temporary shielded object information transmitted from the vehicle X.

[Variation 2 of Step S104]

The object information collecting unit 105 may transmit information indicating the temporary shielded area S2 (area information) to another vehicle and various servers, in addition to transmitting the temporary shielded object information to another vehicle and various servers. The information indicating the temporary shielded area S2 is, as described above, information on an area where an object is not able to be detected in the first viewpoint, and the object becomes newly detectable in the second viewpoint different from the first viewpoint. For example, the object information collecting unit 105 transmits information indicating a geographical location or a range of the temporary shielded area S2 and information indicating a geographical location of the vehicle X in the second viewpoint where the temporary shielded area S2 becomes detectable.

As described above, by transmitting the information indicating the temporary shielded area S2 from the vehicle X to another vehicle, another vehicle can store and recognize a feature that the temporary shielded area S2 is an area where the object can be detected by a sensor of travelling another vehicle. By receiving the information indicating the temporary shielded area S2, another vehicle can determine that the object in the temporary shielded area S2 becomes detectable in the second viewpoint after passing the first viewpoint, although the object is not able to be detected by the sensor in the first viewpoint. Therefore, for example, another vehicle can plan in advance a travel plan for controlling another vehicle based on the assumption that the object is detected by the sensor of another vehicle in the second viewpoint.

[Variation 3 of Step S104]

Further, the object information collecting unit 105 may transmit information indicating an area (a non-detection area) where the object is not able to be detected in the first viewpoint, and further the object is not able to be detected in the second viewpoint either (non-detection area information) from the vehicle X to another vehicle and various servers via the object communication unit 116. The pieces of information indicating the non-detection area are, for example, information indicating a geographical location or a range of an area in the priority area S1 other than the temporary shielded area S2, and information indicating a geographical location of the second viewpoint.

As described above, by transmitting the non-detection area where the object is not able to be detected even in the second viewpoint from the vehicle X to another vehicle and various servers, another vehicle can store and recognize the non-detection area as an caution area where the object is not able to be detected by the sensor of another vehicle, even when another vehicle travels on the road. This enables another vehicle to reflect the non-detection area to the control of travelling of another vehicle, such as, for example reducing a speed at the time of traveling on the road.

In processes after step S104, the object information stored in the object information collecting unit 105 in the vehicle X is used as an information source for generating a travel route for avoiding an area where an object is present.

The object information stored in the object information collecting unit 105 in the vehicle X is transmitted to another vehicle and various servers via the object communication unit 116 to be used in another vehicle and various servers. Object information to be transmitted to another vehicle and various servers is exemplified in Table 1, which will be described later.

[Sequence of Information Transmission/Reception Process]

Figure 5:
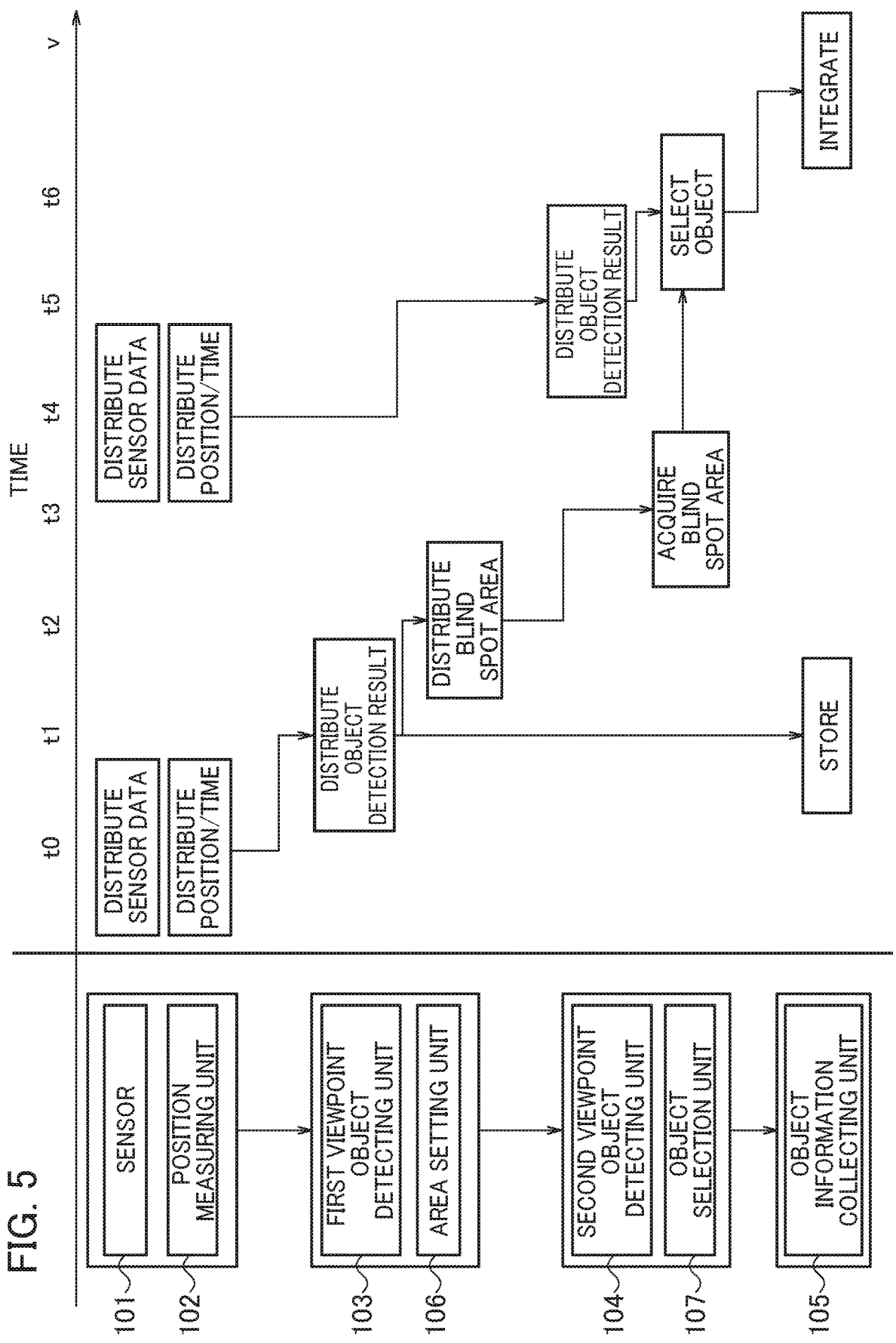
FIG. 5 is a sequence showing information transmission/reception process.

Next, information transmission/reception processes performed among functional units will be described. FIG. 5 is a sequence showing procedures of the information transmission/reception processes performed by the information processing device 1.

Time t0;

First, in the sensor 101, a visible light camera photographs space around the vehicle X, and a laser range finder measures a distance, a direction, and the like of an object present around the vehicle X. Thereafter, the sensor 101 distributes the photographed image data and the measured data to the first viewpoint object detecting unit 103. At the same time, the position measuring unit 102 measures a current position of the vehicle X and distributes the measured current position to the first viewpoint object detecting unit 103 together with a current time.

Time t1;

Next, the first viewpoint object detecting unit 103 detects the object by calculating a position of the object present on or around a road in the first viewpoint, and distributes the detection result of the object to the area setting unit 106 and the object information collecting unit 105.

Time t2;

Next, the area setting unit 106 sets, as the priority area S1, a blind spot area useful for a driver of the vehicle X or the automatic driving system, among a plurality of blind spot areas which are not able to be detected within a sensor view angle range of the sensor 101 due to an object presenting in front of the vehicle X. Thereafter, the area setting unit 106 distributes area specifying information of the priority area S1 to the object selection unit 107.

Time t3;

Next, the object selection unit 107 receives the area specifying information of the priority area S1.

Time t4;

Next, in the sensor 101, the visible light camera photographs space around the vehicle X, and the laser range finder measures the distance, direction, and the like of the object presenting around the vehicle X. Thereafter, the sensor 101 distributes the photographed image data and the measurement data to the second viewpoint object detecting unit 104. At the same time, the position measuring unit 102 measures the current position of the vehicle X and distributes the measured current position to the second viewpoint object detecting unit 104, together with the current time.

Time t5;

Next, the second viewpoint object detecting unit 104 detects the object by calculating the position of the object on the road in the second viewpoint, and distributes the detection result of the object to the object selection unit 107, and the object information collecting unit 105.

Time t6;

Next, the object selection unit 107 uses the area specifying information of the above described priority area S1 and the object information of the second viewpoint to preferentially distribute, to the object information collecting unit 105, the temporary shielded object information included in the temporary shielded area S2 that is newly detectable in the second viewpoint and has been temporarily shielded in the first viewpoint.

Time t7;

Finally, the object information collecting unit 105 integrates the object information received from the object selection unit 107 with existing object information.

Effect of First Embodiment

According to the present embodiment, the first viewpoint object detecting unit 103 in the information processing device 1 detects the object in the first viewpoint, and then, the area setting unit 106 sets, as the priority area S1, the predetermined blind spot area among blind spot areas where the object is not able to be detected based on the detection result of the object.

Further, the second viewpoint object detecting unit 104 detects the object in the second viewpoint, and the object selection unit 107 selects the object in the temporary shielded area S2 which becomes newly detectable in the second viewpoint within the priority areas S1 where the object could not be detected in the first viewpoint.

This enables the driver of the vehicle X and the automatic driving system to grasp the possibility of the presence of the object in advance and to plan a travel route for avoiding a stationary object presenting on the road well in advance. As a result, it is possible to efficiently acquire information useful for the driver or the automatic driving system.

Second Embodiment

A second embodiment applied with the present invention will be described.

[Constitutions of Vehicle and Information Processing Device]

FIG. 6 is a diagram showing constitutions of the vehicles A and B according to the second embodiment. The vehicle A may further have the constitution of the vehicle B, and the vehicle B may also have the constitution of the vehicle A. In other words, each of the vehicle A and the vehicle B may have all of the functional units shown in FIG. 6, as a single vehicle.

[Constitution of Vehicle A]

The vehicle A is mounted with a sensor 101A, a position measuring unit 102A, a second viewpoint object detecting unit 104A, an object selection unit 107A, a map information storage unit 111A, an object selection area correction unit 112A, and a communication unit 113A. The vehicle A may further have all of the functional units in the vehicle B.

The sensor 101A has a function of measuring a distance to an object presenting around the vehicle A, a direction and the like of the object.

The position measuring unit 102A has a function of measuring a current position of the vehicle A.

The second viewpoint object detecting unit 104A has a function of detecting the object presenting on the road in the viewpoint of the vehicle A by using the measurement data by the sensor 101A, and the measurement data by the position measuring unit 102A. For example, the second viewpoint object detecting unit 104A detects position information on a vehicle, an obstacle, or the like presenting in a 360-degree orientation area of the vehicle A.

The object selection unit 107A has a function of selecting the object in a priority area detected in the viewpoint of the vehicle A, among objects in the priority area set by the area setting unit 106B of the vehicle B which will be described by using the detection result of the object by the second viewpoint object detecting unit 104A, and preferentially outputting the selected object information to the communication unit 113A.

Further, if the priority area set by the vehicle B is extended (added) by the object selection area correction unit 112A, the object selection unit 107A has a function of also selecting the object in the extended priority area (the extension area) and preferentially outputting the selected object information to the communication unit 113A with the same priority as in the priority area set by the area setting unit 106B of the vehicle B.

Further, the object selection unit 107A has a function of also selecting the object from a non-priority area other than the priority area (including the extension area) among all the detected areas, and outputting the selected object information to the communication unit 113A with the priority following the above described priority.

The map information storage unit 111A has a function of storing map information including road information, lane information, traffic signal information, building information, and the like, and outputting map information on the periphery of a position of the vehicle A to the object selection area correction unit 112A.

The object selection area correction unit 112A has a function of determining whether it is necessary to change a lane by considering the influence (for example, a lane blockade, and the like) of the object detected by the second viewpoint object detecting unit 104A, based on the lane information in the map information output by the map information storage unit 111A, the detection result of the object by the second viewpoint object detecting unit 104A, and the position information on the vehicle A.

The function of determining whether it is necessary to change a lane is a function of detecting the presence of a stationary object such as a road obstacle or a stopped vehicle in a planned travel lane in front of the vehicle A for example, determining whether the vehicle A can travel on an adjacent lane if the stationary object is detected, and determining that the lane change is necessary if the vehicle A can travel on the adjacent lane.

If the vehicle A needs to change a lane or the like, the object selection area correction unit 112A has a function of extending (adding) the priority area set by the vehicle B based on road boundary line information detected by road boundary line detecting means (not shown).

For example, the object selection area correction unit 112A extends the priority area set by the vehicle B to the entire road width including a travelling lane of the vehicle A (corresponding to the priority area) and a lane adjacent to the travelling lane (corresponding to an extension area to be added to the priority area). If an opposite lane is set as the extension area, the object selection area correction unit 112A adds an area from a position of the vehicle A to a position for the vehicle A to reach if the vehicle A travels for 15 seconds in a travel direction of the vehicle A. If the lane information is not stored in the map information storage unit 111A, the object selection area correction unit 112A makes a correction (extension) such that the priority area is inside the road boundary line on the road. As the road boundary line, for example, a white line on a road, a boundary line between curbstones and a road, a boundary line between a road structure such as a street tree shrub and a road, a boundary line between a building and a road, a vehicle and the like are used.

The communication unit 113A has a function of receiving, from the vehicle B, request data for requesting object information included in the priority area set by the vehicle B. The request data transmitted from the vehicle B to the vehicle A includes, for example, data for identifying the requesting vehicle (an identification code or the like of the vehicle B), a flag showing a priority level of requesting of object information (a flag showing that a priority level is high or the like), a search area in which an object is detected (data and the like indicating a geographical range of a priority area), and an expiration date for requesting object information (a time limit of the transmission date of the object information or the like). The data indicating the geographical range may be data expressed by latitude and longitude, or may be expressed by data indicating nodes and links included in the road map.

The communication unit 113A has a function of preferentially transmitting the object information of the priority area set by the vehicle B to the vehicle B. Further, the communication unit 113A has a function of transmitting the information on the object which will be able to be detected in the future in the extended priority area to the vehicle B with the same priority, if the priority area is extended by the object selection area correction unit 112A. Further, the communication unit 113A has a function of transmitting, to the vehicle B, the object information of the non-priority area with the priority following the above described priority. The object information is, as described in the first embodiment, position information or the like of a vehicle, an obstacle or the like presenting on a road.

For example, in order to preferentially transmit pieces of information on objects detected in the requested priority area and the extended priority area individually, the communication unit 113A transmits in advance, to the requesting vehicle, the distribution order information in which a lane link ID corresponding to the requested priority area, and a lane link ID corresponding to the extended priority area are set as a first lane link ID and a second lane link ID respectively, and lane link IDs corresponding to non-priority areas other than each of the priority areas are set as third or later lane link IDs. Thereafter, the communication unit 113A transmits the pieces of object information of the priority areas and each non-priority area individually to the vehicle B in the distribution order of the distribution order information.

As described in the first embodiment, the communication unit 113A transmits and receives data through direct communication between vehicles based on, for example, DSRC (Dedicated Short Range Communications) system in accordance with IEEE (Institute of Electrical and Electronics Engineers) 802.11p or LTE (Long Term Evolution) cellular V2X system in accordance with 3GPP (Release 14). The same applies to the communication unit 110B, which will be described later.

[Variation 1 of Communication Unit 113A]

The communication unit 113A may further transmit information indicating an area which is a detection area where the object is detected by using the sensor 101A of the vehicle A and which is temporarily shielded (corresponding to the temporarily shielded area in the first embodiment) among the priority areas in addition to the object information of the above described priority area (the extension area may be included in the priority area). The information indicating the temporary shielded area is information indicating a geographical location or a range of the temporary shielded area and information indicating a geographical location of the vehicle A when the temporary shielded area is detected.

As described above, by transmitting the information indicating the temporary shielded area from the vehicle A to the vehicle B, the vehicle B can store and recognize that the object can be detected in the temporary shielded area by using the sensor of the vehicle B during traveling. By receiving the information indicating the temporary shielded area, the vehicle B can determine that the object in the temporary shielded area can be detected at a position at which the vehicle A detects the temporary shielded area. Therefore, for example, the vehicle B can plan in advance a travel plan for controlling the vehicle B based on the assumption that of object can be detected by using the sensor of the vehicle B at the position at which the vehicle A detects the temporary shielded area.

[Variation 2 of Communication Unit 113A]

The communication unit 113A may also transmit information indicating an area (the non-detection area in the first embodiment) where the object could not be detected by the vehicle A even if the vehicle A travels around the priority area received from the vehicle B. The information indicating the non-detection area is, for example, information indicating a geographical location or a range of the non-detection area, and information indicating a geographical location of the vehicle A when the vehicle A is not capable of detecting the object (travelled route information of the vehicle A and the like).

As described above, by transmitting the non-detection area where the object is not able to be detected even when the vehicle A travels from the vehicle A to the vehicle B, the vehicle B can store and recognize the non-detection area as a caution area where the object is not able to be detected by using the sensor of the vehicle B even when the vehicle B travels on the road. Therefore, the vehicle B can reflect the non-detection area in the control of travelling of the vehicle B, such as reducing a speed when traveling on the road.

[Common Items of Variations 1 and 2 of Communication Unit 113A]

The temporary shielded area and the non-detection area described in the Variations 1 and 2 of the communication unit 113A are applicable not only to the priority area before extension set by the vehicle B, but can also to the extended priority area which is extended by the vehicle A. In other words, the vehicle A can transmit, to the vehicle B, information indicating the temporary shielded area where the object is detected by using the sensor of the vehicle A among the priority areas extended by the vehicle A and information indicating the non-detection area where the object is not able to be detected by the vehicle A when the vehicle A travels around the extended priority area.

The temporary shielded area, the priority area, and the extension area will be described again.

The temporary shielded area is an area which has been shielded due to the influence of a shielding object located in front of a predetermined vehicle on a travelling lane of the vehicle and an area where the vehicle can detect an object when temporarily moving to avoid the shielding object. For example, the temporary shielded area is an area which can be detected when the vehicle avoids a preceding vehicle that is stopped, and is an area for detecting the object that covers both the original travelling lane and a lane adjacent to the travelling lane.

On the other hand, the priority area is an area set by another vehicle to acquire object information, and in the case of the above described example, is an area on the original travelling lane. Further, the extension area is an area obtained by extending the priority area, and in the case of the above described example, is an area that is adjacent to the priority area and an is an area on a lane adjacent to the above described travelling lane.

[Object Information Transmitted from Vehicle a to Vehicle B]

Table 1 shows an example of object information transmitted from the vehicle A to the vehicle B. The object information is object information and area information which are the results of sensing performed by the vehicle A based on the request from the vehicle B, and is an example of a data structure of answer content data which is a response to the vehicle B from the vehicle A.

TABLE 1

| Header | | |
|---|---|---|
| | 1. | Identification code of vehicle (vehicle A) as data creation subject |
| | 2. | Index of object information |
| | (1) | Total number of object information included in content data area |
| | (2) | Flag showing that a response to a request for object detection in priority area transmitted by another vehicle (vehicle B) is included<br>Identification code of another vehicle (vehicle B) which requests to detect object<br>Identification code for specifying request to detect object transmitted from another vehicle (vehicle B)<br>Identification code for specifying priority area where another vehicle (vehicle B) requests to detect object in priority area<br>Identification code showing information on object detected in priority area by host-vehicle (vehicle A), included in the content data |
| | (3) | Flag showing whether extension area relative to priority area transmitted from another vehicle (vehicle B) is present<br>Identification code of another vehicle (vehicle B) which requests to detect object<br>Identification code for specifying request to detect object transmitted from another vehicle (vehicle B)<br>Identification code for specifying priority area where another vehicle (vehicle B) requests to detect object in priority area<br>Identification code for specifying extension area obtained by extending priority area in which another vehicle (vehicle B) requests to detect object in priority area, included in content data<br>Identification code showing information on object detected in extension area, included in content data<br>Identification code for specifying reduction area for reducing priority area in which another vehicle (vehicle B) requests to detect object in priority area, included in content data<br>Identification code showing object information detected in reduction area, included in the content data |
| | (4) | Flag showing that information on area (temporary shielded area) which could not be detected by host-vehicle (vehicle A) due to presence of shielding object but becomes detectable by changing viewpoint is included<br>Identification code showing area information on temporary shielded area, included in content data<br>Identification code showing information on object which is detected in temporary shielded area, included in content data |
| | (5) | Flag showing information on area (non-detection area) where host-vehicle (vehicle A) is not able to detect object during travelling is included<br>Identification code showing area information of non-detection area by host-vehicle, included in content data |
| | (6) | Identification code showing area (detection area) where host-vehicle (vehicle A) could detect object during travelling<br>Identification code showing area information of detection area by host-vehicle, included in content data<br>Identification code showing information on object detected in detection area, included in content data |

TABLE 1-continued

Content data
1. Object information storage area
    (1) Object identification code (for example, numbers such as #0001, #0002, and #0003 in order from the top)
    (2) Identification code for identifying area where object is detected (identification code indicating in which area (any one of priority area, extension area, reduction area, temporary shielded area, non-detection area, and detection area) detected object is present)
    (3) Sensor information
        Sensor identification code and sensor type of sensor mounted on vehicle that detects object, sensing cycle by sensor, frame number of image in which object information is acquired, the number of frames of image transmitted as object information, camera, visual axis, view angle, object recognition accuracy and the like
    (4) Basic message of vehicle that detects object (may be in accordance with SAEJ2945/1BSM and the like)
        Date and time, position, traveling direction, and speed of vehicle when object is detected
        Past travel route and future planned travel route of vehicle that detects object
    (5) Object information
        Geographical location of detected object (position specified by latitude and longitude, position specified by predetermined parameter (node or link) of road map, position relative to sensor or the like that detects object)
        Date and time at which object is detected
        Traveling direction and speed of detected object
        Stationary duration of detected object
        Data showing object type (for example, person, vehicle (standard-sized vehicle, large-sized vehicle, two-wheel vehicle and the like), bicycle, road structure, road obstacle and the like)
        Data showing object size (data showing length, width, and height)
        Detailed information on road structure Road width, lane width, number of lanes, road alignment regulation information, and regulation vehicle speed information and the like are described
        Still image data, video data and point cloud format data including the object or files storing the data
2. Area information storage area
    (1) Area identification code (for example, numbers such as #0001, #0002, and #0003 in order from the top)
    (2) Identification code for identifying area type (identification code for identifying which one of priority area, extension area, reduction area, temporary shielded area, non-detection area, and detection area is the area)
    (3) Area data
        Geographical location or range of area (position or range specified by latitude and longitude or predetermined parameter (node or link) of road map, position or range relative to sensor or the like that detects object), area dimension, link ID, a group of node IDs for each link, node ID, node position information (GNSS coordinate), data showing adjacent area ID, road ID and lane ID on area, map ID, version information and the like ※ In the case of multiple pieces of object information, data sets of (1) to (5) above are repeated and stored for each object identification code.
※ In the case of multiple pieces of area information, data sets of (1) to (3) above are repeated and stored for each area identification code.

[Constitution of Vehicle B]

Next, the vehicle B will be described.

The vehicle B is mounted with a sensor 101B, a position measuring unit 102B, a first viewpoint object detecting unit 103B, an object information collecting unit 105B, an area setting unit 106B, a map/planned travel route information storage unit 108B, an area correction unit 109B, and a communication unit 110B. The vehicle B may further be mounted with all of the functional units of the vehicle A.

The sensor 101B has a function of measuring a distance to an object presenting around the vehicle B, a direction of the object and the like.

The position measuring unit 102B has a function of measuring a current position of the vehicle B.

The first viewpoint object detecting unit 103B has a function of detecting an object presenting on a road in the viewpoint of the vehicle B by using measurement data by the sensor 101B, and measurement data by the position measuring unit 102B. For example, the first viewpoint object detecting unit 103B detects information on a position of a vehicle, an obstacle, or the like which is present in a 360-degree orientation area of the vehicle B.

The object information collecting unit 105B has a function of collecting and storing detection results of objects detected individually by the first viewpoint object detecting unit 103B and the second viewpoint object detecting unit 104A of the vehicle A in association with a detection time.

The area setting unit 106B has a function of setting, as the priority area, a monitoring area that is a predetermined blind spot area among a plurality of blind spot areas that could not be detected or were difficult to be detected and that are determined by the area correction unit 109B, in order to supplement, with another viewpoint information, a blind spot area where an object could not be detected by the first viewpoint object detecting unit 103B within a sensor view angle of the sensor 101B. The priority area is an area based on a boundary based on a predetermined object (for example, a white line on a road, a vehicle on a road) detected by the vehicle B at least at a predetermined timing.

Further, the area setting unit 106B has a function of setting a temporary shielded area where an object is not able to be detected in the first viewpoint and the object can be detected in the second viewpoint that is different from the first viewpoint in terms of time based on results of detecting the object on the road. In this case, the vehicle B further includes the constitution of the vehicle A (the second viewpoint object detecting unit 104A and the like).

The map/planned travel route information storage unit 108B stores map information including road information, lane information, traffic signal information, building information, or the like, and has a function of storing pieces of information on a future planned travel route and a speed plan of the vehicle B based on a route plan designated by the driver of the vehicle B or the automatic driving system.

The area correction unit 109B has a function of acquiring the future planned travel route and speed plan of the vehicle B, and determining a monitoring area to be preferentially set in the future for the driver of the vehicle B or the automatic driving system among the priority area set by the area setting unit 106B based on the planned travel route and the speed plan.

For example, the area correction unit 109B determines, as the monitoring area, a road area from a position of the vehicle B to a position for the vehicle B to reach if the vehicle B travels for about 15 seconds along the planned travel route. In addition, if a branch point such as an intersection or a junction is present on the planned travel route, the area correction unit 109B determines a road of an opposite lane entering the branch point as the monitoring area also. Specifically, the area correction unit 109B sets, as the monitoring area, an area on an entering side road from the branch point to a position far away from the branch point by a distance equivalent to, for example, a distance from the vehicle B to the branch point, or an area on the entering side road from the branch point to a position far away from the branch point by a distance travelled by the vehicle B if the vehicle B travels for the same amount of time it takes to arrives at the branch point.

The area setting unit 106B and the area correction unit 109B use the map information stored in the map/planned travel route information storage unit 108B to set or determine the blind spot area, the priority area, and the monitoring area based on a lane link ID on the map.

The communication unit 110B has a function of transmitting request data for requesting object information included in the priority area set by the area setting unit 106B to neighboring vehicles. The request data includes, for example, information on the priority area, pieces of information on the position and the planned travel route of the vehicle B requesting the object information and the like. Further, the communication unit 110B has a function of transmitting the temporary shielded area to the vehicle A such as the vehicle B, a vehicle other than the vehicle A, or various servers. If a plurality of vehicles capable of performing V2X communication are present in the vicinity of the vehicle B within a radio wave range, the communication unit 110B has a function of selecting any one or more vehicles among the plurality of vehicles. Further, the communication unit 110B has a function of receiving the object information transmitted from the requested vehicle (the vehicle A) that receives the request data.

[Request Data Transmitted from Vehicle B to Vehicle A]

Table 2 shows an example of the request data transmitted from the vehicle B to the vehicle A. The request data is an example of a data structure for requesting information on the object presenting in the priority area.

TABLE 2

| Header | 1. Information on vehicle (vehicle B) as data creation subject |
|---|---|
| | (1) Identification code of vehicle B |
| | (2) Basic message of vehicle B as data creation subject (date and time at which data is created, current position, traveling direction, and speed of vehicle (may be in accordance with SAEJ2945/1BSM and the like) |
| | 2. Information for requesting another vehicle (vehicle A) to transmit information on object in priority area |
| | (1) Flag showing that transmission of object information to vehicle B is requested |
| | (2) Request Identification code for identifying the request |
| | (3) Identification code for identifying area information of priority area in which transmission of information on object presents in priority area is requested to another vehicle |
| | (4) Time limit for requesting object information (date and time) |
| | (5) Maximum data size of object information in which transmission of object information is requested to another vehicle (for example, up to 1GB) |
| | (6) Data type of object information in which transmission of object information is requested to another vehicle (text data, still image data, or video data) or file type (extension such as MPEG or AVI) |

TABLE 2-continued

| | |
|---|---|
| Content data | 1. Area information storage area<br>(1) Identification code of priority area<br>(2) Area data<br>Geographical location or range of area (position or range specified by latitude and longitude, or predetermined parameter (node or link) of road map, position or range relative to sensor or the like that detects object), area size, link ID, a group of node IDs for each link, node ID, node position information (GNSS coordinate), data showing adjacent area ID, road ID and lane ID on area, map ID, version information and the like |

※ In the case of multiple pieces of area information, data sets of (1) and (2) above are repeated and stored for each area identification code

[Information Processing Method]

Figure 7A:
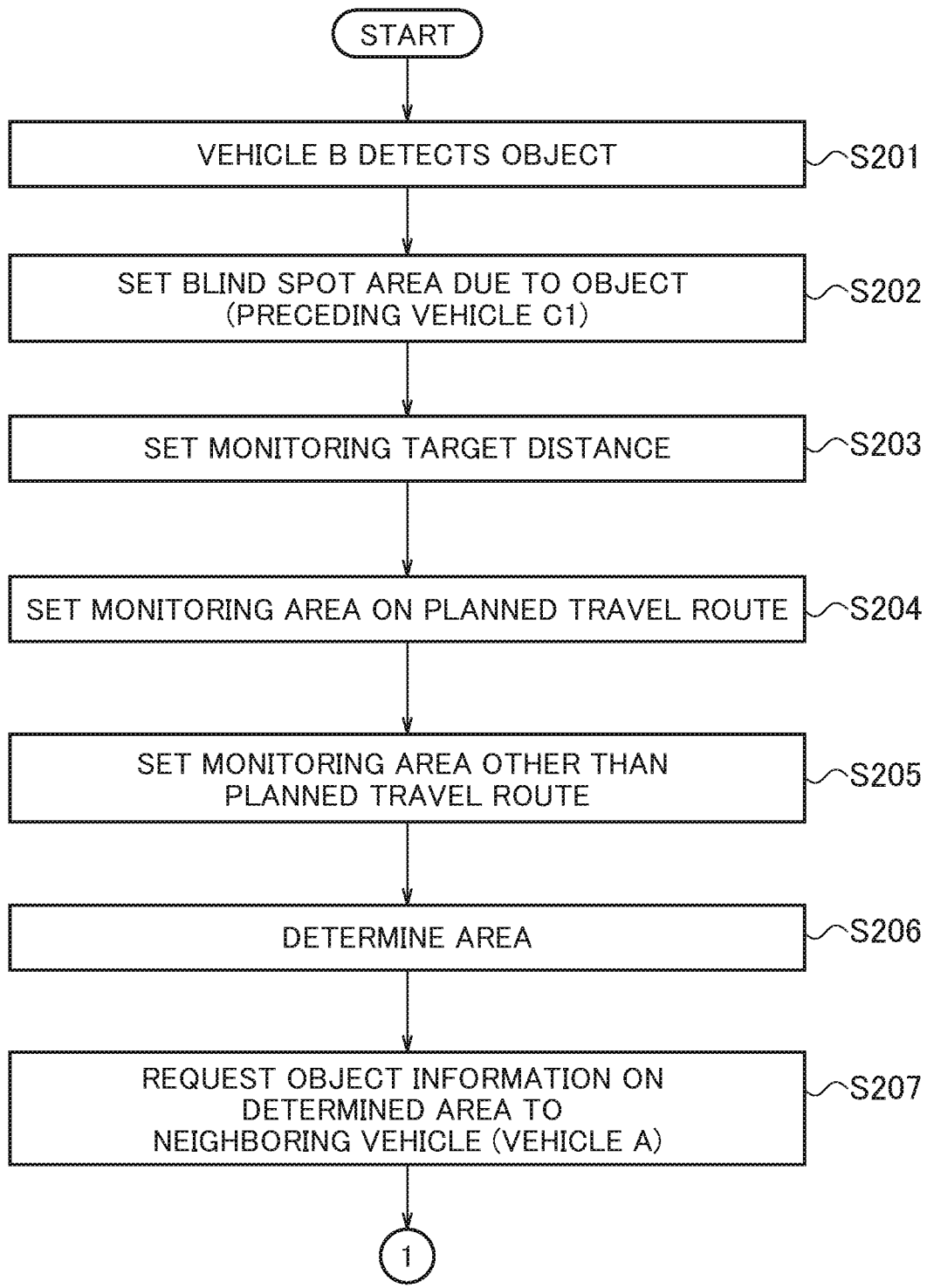
FIG. 7A is a flowchart showing process procedures of an information processing method.

Next, an information processing method performed by the information processing device 1 will be described. FIGS. 7A and 7B are flowcharts showing process procedures in the information processing method.

First, preconditions will be described with reference to FIG. 8. The vehicle B has a planned travel route to turn left at an intersection with no traffic signal, and has a travel plan to travel at a maximum speed of 40 km/h. The vehicle B is passing a position far away from the intersection by a distance of 50 m in front of the intersection. In front of the vehicle B, a preceding vehicle C1 which is not capable of performing V2X communication is present. A parked vehicle C2 is present at a predetermined position in the planned travel route of the vehicle B, which will appear after the vehicle B turns left at the intersection. The vehicle A is in a timing of overtaking the parked vehicle C2 in the planned travel route of the vehicle B. The vehicle A is present at a possible position for the vehicle B to reach if the vehicle B travels for 15 seconds, that is the vehicle A is present at a position 130 m ahead of vehicle B.

Step S201;

First, the first viewpoint object detecting unit 103B in the vehicle B detects the object in the 360-degree orientation area of the vehicle B. Thereafter, the first viewpoint object detecting unit 103B stores the detection result of the object in the object information collecting unit 105B, and transmits the detection result to the area setting unit 106B. In this diagram, the preceding vehicle C1 in an area in front of the vehicle B is detected as an object.

Step S202;

Next, the area setting unit 106B sets, as the priority area, the blind spot area where the object is not able to be detected due to the presence of the preceding vehicle C1 among the blind spot areas where the objects are not able to be detected. For example, as shown in FIG. 8, the area setting unit 106 determines an intersecting point between the vehicle C1 and each of the parting lines L1 and L2. Then, the area setting unit 106 sets, as the priority area, an area behind the vehicle C1 and includes the vehicle C1 sandwiched between the parting lines L1 and L2.

Step S203;

Next, the area correction unit 109B sets a monitoring target distance in the priority area by using the planned travel route and speed information of the vehicle B acquired from the map/planned travel route information storage unit 108B. If a road area from the current position of the vehicle B, to a position for the vehicle B to reach if the vehicle B travels for about 15 seconds, along the planned travel route is used as a monitoring area, the maximum vehicle speed of the vehicle B is 40 km/h, and thus, the area correction unit 109B sets a distance from the current position of the vehicle B to a position 162 m ahead of the current position of the vehicle B along the planned travel route as the monitoring target distance.

Step S204;

Next, the area correction unit 109B sets, as the monitoring area S1, 50 m of road section in which the vehicle B travels along the planned travel route, and a lane and a road which appear after the vehicle B travels for a distance of 112 m after turning left at the intersection. The area is designated based on a lane link ID on the map and a travel distance from the intersection. If a high-precision map is provided in a road infrastructure network or is mounted on a vehicle, only the lane link ID may be used. Complementary or alternatively, four or more position coordinates of road/lane boundaries may be set.

Step S205;

In addition, the area correction unit 109B sets a lane and a road in a 50 m section from the intersection on a side opposite to the vehicle B as the monitoring area S2, because the road of the opposite lane entering the intersection along the planned travel route is also a blind spot area for the vehicle B.

Step S206;

Next, the area setting unit 106B determines monitoring areas S1 and S2 set by the area correction unit 109B in steps S204 and S205 in the priority area set in step S202 as priority areas S1 and S2 of the vehicle B.

In steps S205 and S206, the area setting unit 106B may set the temporary shielded area where the object is not able to be detected in the first viewpoint and the object can be detected in the second viewpoint different from the first viewpoint in terms of time.

Step S207;

Thereafter, in order to request the object information included in the determined priority areas S1 and S2 of the vehicle B, the communication unit 110B selects any one of a plurality of neighboring vehicles that can communicate and transmits the request data to the selected vehicle (the vehicle A). If the temporary shielded area is set, the communication unit 110B further transmits the temporary shielded area. At this time, the communication unit 110B may request the object information included in the temporary shielded area. The request data (data structure of packet) transmitted from the vehicle B to the vehicle A is as shown in Table 2.

Step S208;

Next, the communication unit 113A in the vehicle A receives the request data from the vehicle B. The request data includes information on the priority areas S1 and S2, information on the position and the planned travel route of the vehicle B requesting the object information, and the like.

Step S209;

Next, the second viewpoint object detecting unit 104A detects the object in the 360-degree orientation area of the vehicle A. Thereafter, the second viewpoint object detecting unit 104A transmits the detection result of the object to the area setting unit 106B and the object selection area correction unit 112A. The vehicle C2 parked in an area in front of the vehicle A is detected as the object.

Step S210;

Next, the object selection area correction unit 112A observes the status of a monitoring lane based on lane information on a map acquired from the map information storage unit 111A and the detection result of the object by the second viewpoint object detecting unit 104A.

Step S211;

Next, the object selection area correction unit 112A further uses the position information and the speed information of the vehicle A to determine whether the lane change is necessary due to the lane blockade caused by the object detected by the second viewpoint object detecting unit 104A. For example, if the detected object is mapped on a map, the object selection area correction unit 112A determines that a lane is temporarily blocked due to a parked vehicle, construction work, fallen object or the like based on the fact that the detected object does not have a moving speed. If the lane change is necessary, a process proceeds to step S212, and alternatively if the lane change is not necessary, the process proceeds to step S213.

Step S212;

If the lane change is necessary, the object selection area correction unit 112A increases the priority of the non-priority area of the adjacent lane, and adds the area as a priority area S3 (an extension area). It is assumed that the priority of the priority area S3 is the same as or higher than that of the priority areas S1 and S2. For example, if it is assumed that the vehicle A arrives at a blocked area after travelling for 13 to 25 seconds (upper limit), and the added area is an opposite lane, an area from a lane blockade point to a position for the vehicle A to reach if the vehicle A travels for 13 to 25 seconds (upper limit) at a travel speed of 0 km/h to 50 km/h (speed limit) is designated as the priority area S3, and the area is a range from the lane blockade point to a position far away by a distance of 337 m from the lane blockade point.

Step S213;

Next, the object selection unit 107A selects the object in the priority areas S1 and S2 set by the vehicle B, and also selects the object in the priority area S3 added by the object selection area correction unit 112A. If the object is present in the non-priority area, the object selection unit 107A also selects the object in the non-priority area. The priority area S3 can be said to be an area added by the correction because, even if the object on the blockade lane is selected, the road passed by the vehicle A is not properly selected.

Step S214;

Finally, the communication unit 113A sets, in a header part of the packet, distribution order information in which each lane link ID corresponding to each of the priority areas S1 to S3 (which may include an end point corresponding to a travel distance from an intersection as a starting point) is set as the first to third, and each lane link ID corresponding to each of non-priority areas other than the priority areas is set as the fourth or later. Further, the communication unit 113A sets, in a data part of the packet, the pieces of object information of each of the priority area S1 to S3 and each of the non-priority areas in the distribution order. Thereafter, the communication unit 113A transmits the packet to the vehicle B. At this time, the vehicle A may set the priority of the priority area S3 to be higher than that of the priority areas S1 and S2. The object information (data structure of the packet) transmitted from the vehicle A to the vehicle B is as shown in Table 1.

[Variation of how to Set Priority Area in Area Correction Unit 109B]

Next, how to set priority area when the vehicle B is traveling in an area having a predetermined road shape will be described. The predetermined road shape is, for example, an intersection, a curve, an S-curve, a curve gradient inflection point, or the like.

[Variation 1]

Figure 9:
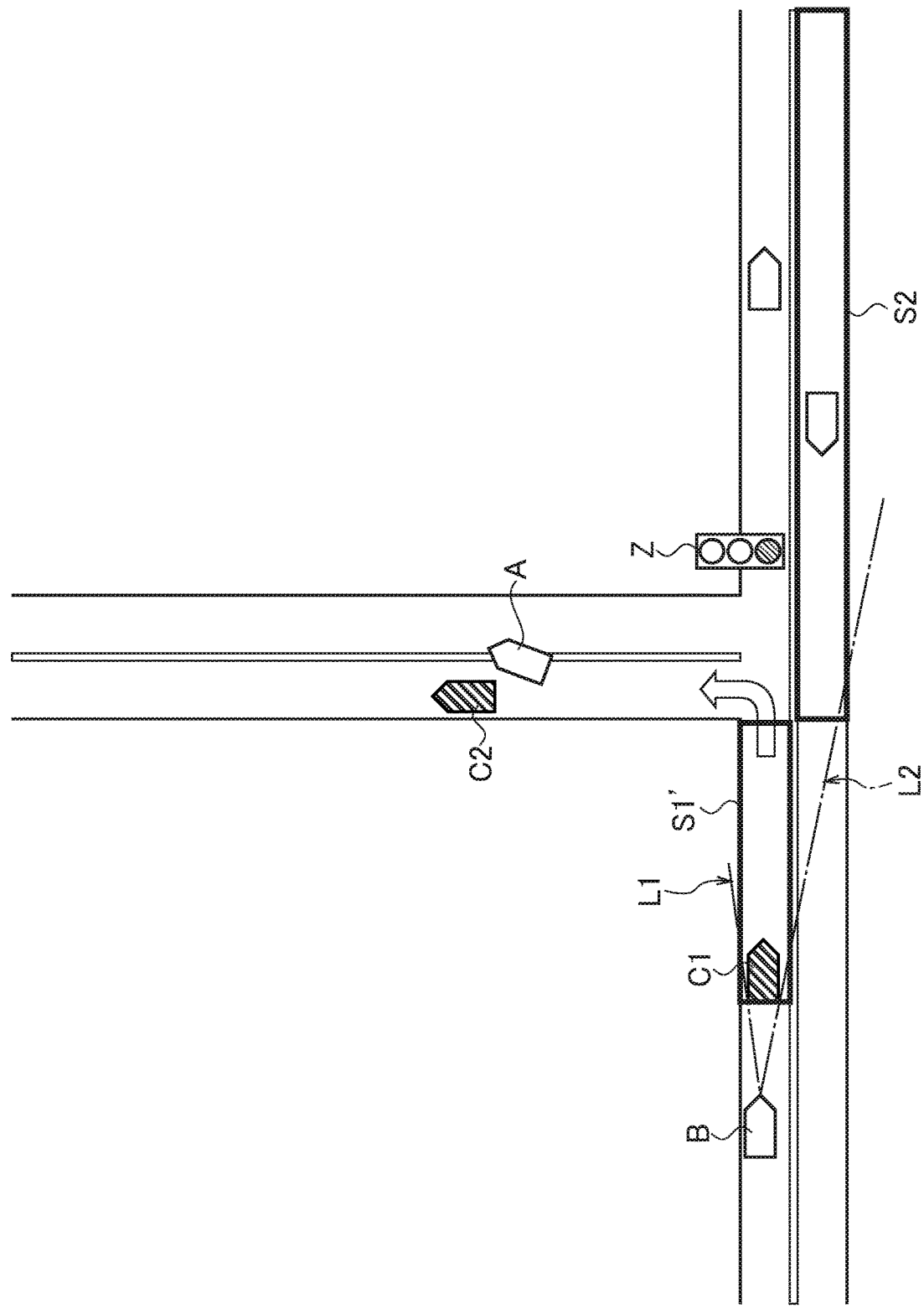
FIG. 9 is a supplementary view for explaining how to set an area (Variation 1).

As shown in FIG. 9, descriptions will be given for a case where a traffic signal Z is located at the intersection in the traveling direction of the vehicle B. If there is a traffic signal, it is highly possible that the situation of the planned travel route will be changed in the future by the temporary stop of the vehicle B due to the traffic signal. Therefore, the area setting unit 106B sets an area S1' from the vehicle B to a stop line in front of the traffic signal as a monitoring area S1', if the traffic signal on the planned travel route continues to be red according to signal pattern information received from a traffic facility server or the like. However, an entering side opposite area enters the intersection, and since it is necessary to monitor a vehicle on the opposite area that may turn right to enter and cross the planned travel route, the area setting unit 106B holds the area as the monitoring area S2 irrespective of the presentation pattern of the traffic signal.

[Variation 2]

Figure 10:
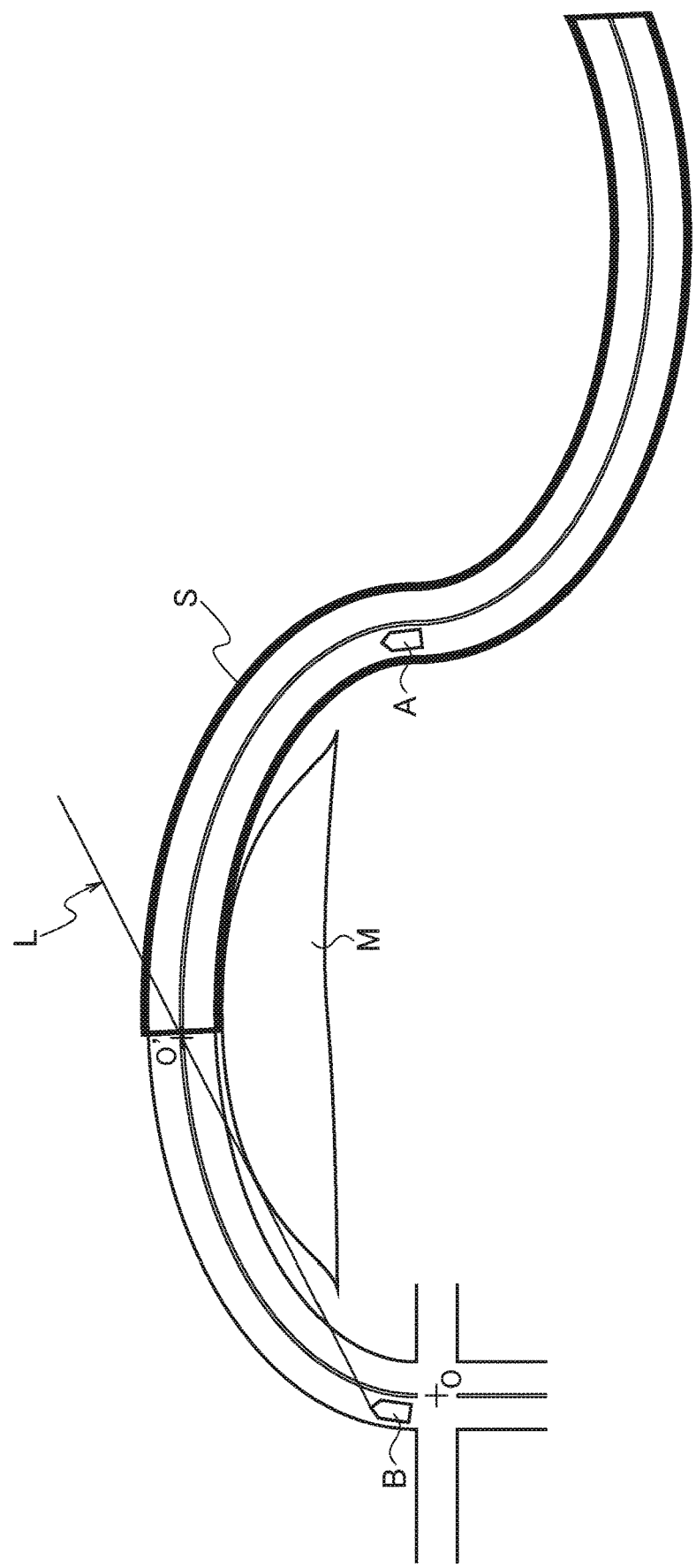
FIG. 10 is a supplementary view for explaining how to set an area (Variation 2).

As shown in FIG. 10, a case where there is a right curve in the traveling direction of the vehicle B and the visibility is poor due to a mountain forest portion M will be described. In the case of an invisible curve, the area setting unit 106B sets a monitoring area based on the mountain forest portion M displayed on the map or detected by the vehicle B, and the current position of the vehicle B. For example, the area setting unit 106B sets a parting line L so as to be in contact with the mountain forest portion M, and obtains an intersecting point O' at which the parting line L crosses with a bisecting line of the road width (an intermediate line of the road width). The area setting unit 106B sets an intersection close to the current position of the vehicle B as a reference point O, sets an area S farther than a travel distance from the reference point O to the intersecting point O' as a shielded area of the vehicle B, and sets the area as the monitoring areas.

[Variation 3]

Figure 11:
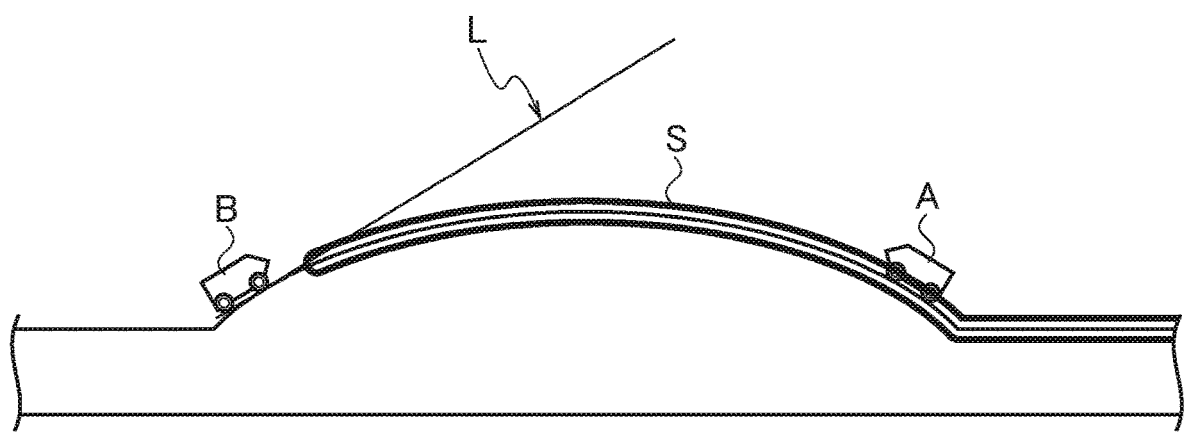
FIG. 11 is a supplementary view for explaining how to set an area (Variation 3).

As shown in FIG. 11, a case where there is an upward gradient in the traveling direction of the vehicle B will be described. The area setting unit 106B sets a parting line L so as to be in contact with a curved road surface, while the vehicle B travels on the curved road surface having the upward gradient, sets an area S where a sensor mounting angle spread of the sensor 101 from a reference height plane of the vehicle B is −10 degrees or less as a shielded area of the vehicle B, and sets the shielded area as a monitoring areas.

[Variation 4]

Figure 12:
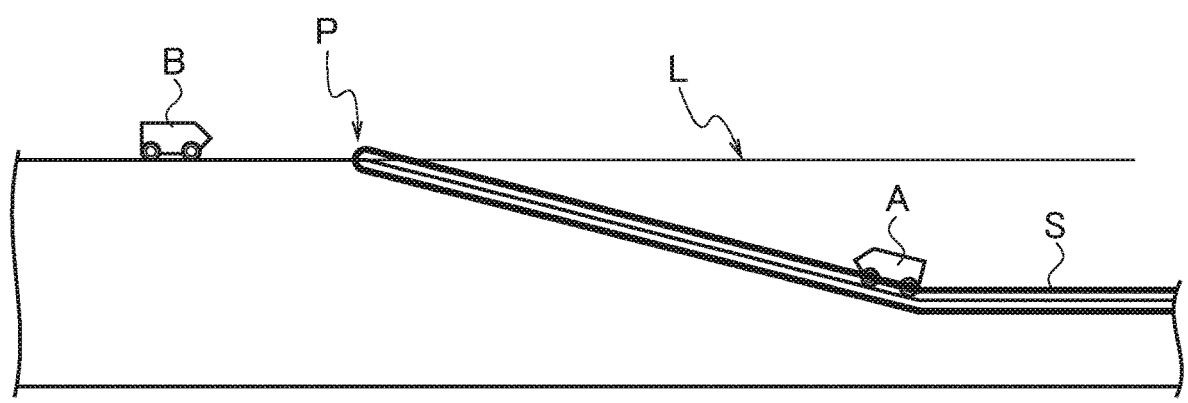
FIG. 12 is a supplementary view for explaining how to set an area (Variation 4).

As shown in FIG. 12, a case where a road gradient changes in a downward direction during the traveling of the vehicle B will be described. The area setting unit 106B sets a parting line L in contact with a flat road surface on which the vehicle B is traveling as a road reference plane L, and observes a change point P at which a road gradient changes on a travel route on a map. Then, the area setting unit 106B sets an area S at a point lower in altitude than the road reference plane L as a shielded area of the vehicle B and sets the shielded area as a monitoring areas.

Effect of Second Embodiment

According to the present embodiment, the area setting unit 106B in the vehicle B determines, as the priority areas S1 and S2, areas that are predetermined blind spot areas among a plurality of blind spot areas that could not be detected by the sensor 101B and also are the monitoring areas S1 and S2 which should be preferentially set in the future for the driver of the vehicle B or the automatic driving system based on the future planned travel route and the speed plan of the vehicle B.

The object selection area correction unit 112A in the vehicle A adds an adjacent lane of the travelling lane as a priority area S3. The object selection unit 107A selects objects in the priority areas S1 and S2 determined by the vehicle B and also selects objects in the added priority area S3. Then, the communication unit 113A preferentially transmits pieces of information on objects present in the priority areas S1, S2, and S3 to the vehicle A.

This enables the vehicle B to recognize that the object information of the priority area is distributed first, and to receive the object information of the priority area preferentially. This eliminates the necessity to wait until the reception of pieces of object information of all blind spot areas is completed, and it is possible to efficiently acquire information useful for the driver or the automatic driving system.

According to the present embodiment, the area setting unit 106B acquires a future position information of the vehicle B requesting the object information. Further, the area setting unit 106B sets, as the priority areas S1 and S2, the monitoring areas where the vehicle B is not capable of detecting the object in the future based on the future position information and the detection result of the object. Accordingly, it is possible to obtain information useful for the driver or the automatic driving system.

Further, according to the present embodiment, the vehicle B includes the map/planned travel route information storage unit 108B that stores map information. The map/planned travel route information storage unit 108B uses the map information to set the priority area based on a lane link ID on the map, and accordingly, the priority area can be specified surely.

According to the present embodiment, the priority area is an area based on a boundary based on a predetermined object detected by the vehicle B at least at a predetermined timing, and thus, the priority area can be surely specified.

Further, according to the present embodiment, the predetermined object is a white line or a vehicle on a road, and therefore, the priority area can be surely specified.

Further, according to the present embodiment, the communication unit 110B selects any one of the plurality of communicable vehicles, and transmits the request data to the selected vehicle. This enables suppression of an increase in the data amount of V2X communication network, and more efficient acquisition of information useful for the driver or the automatic driving system.

Further, according to the present embodiment, the request data includes the information on the position and the planned travel route of the vehicle B requesting the object information, in addition to the information on the priority area. This enables the vehicle A that receives the request to surely grasp the position and the planned travel route of the vehicle B, and to clearly specify the requested area.

According to the present embodiment, the area setting unit 106B sets an area having a predetermined road shape as a priority area. Therefore, it is possible to acquire object information included in areas having various road shapes.

Further, according to the present embodiment, the predetermined road shape is any of an intersection, a curve, and a curve gradient inflection point. Accordingly, it is possible to acquire object information included in an area having the intersection, the curve, or the curve gradient inflection point.

Further, according to the present embodiment, the object information includes information on the object detected in an area different from the priority area, or information on the object that is detectable in the future in an area different from the priority area, in addition to the information on the object detected by the vehicle B in the priority area. Accordingly, it is possible to acquire information more useful for the driver of the vehicle B or the automatic driving system.

Further, according to the present embodiment, the object information includes the information on the vehicle on the road or the position information of the obstacle which is detected by the vehicle B. Therefore, the driver of the vehicle B or the automatic driving system can surely grasp the object information.

Further, according to the present embodiment, the vehicle B has a monitoring sensor for monitoring the side of the road, detects a road boundary line or a background object, and detects an object on the road. The vehicle B obtains an intersecting point between the detected object and a parting line to detect the vehicle or the obstacle. Accordingly, the stationary object can be surely identified.

Further, according to the present embodiment, the information processing device 1 is provided in the vehicles A and B. Accordingly, the internal communication in the vehicle can be performed, and a processing speed can be improved.

Third Embodiment

A third embodiment applied with the present invention will be described. In the third embodiment, how to eliminate the duplicate reception of the same object information at or after the next time if a plurality of vehicles simultaneously observe the same area will be described.

[Constitution of Information Processing Device]

Figure 13:
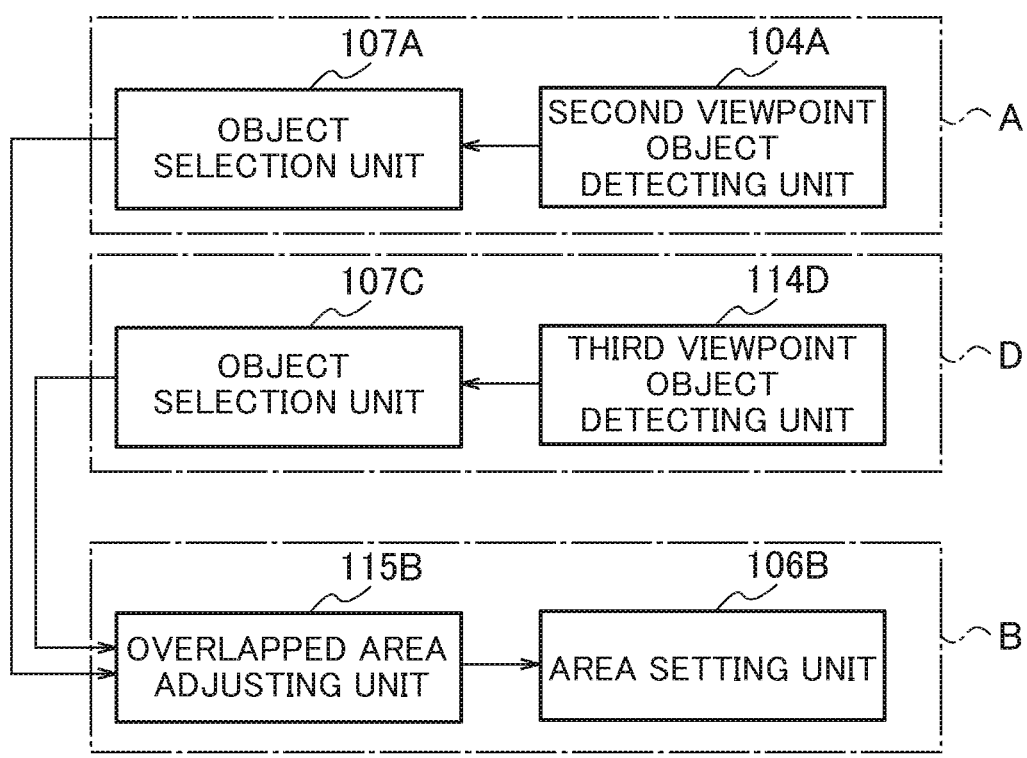
FIG. 13 shows constitutions of vehicles A, B, and D according to a third embodiment.

FIG. 13 is a diagram showing constitutions of vehicles A, B, and D according to the third embodiment.

The vehicle A is mounted with a second viewpoint object detecting unit 104A and an object selection unit 107A. The vehicle A also has other functional units shown in FIG. 6.

The second viewpoint object detecting unit 104A has a function of detecting the object presenting on the road in the viewpoint of the vehicle A.

The object selection unit 107A has a function of selecting the object in the priority area detected in the viewpoint of the vehicle A among objects in the priority area set by the vehicle B, and transmitting the selected object information to the vehicle B. If the vehicle A extends (adds) the priority area, the object selection unit 107A also has a function of transmitting the object information in the extended priority area to the vehicle B.

The vehicle D is mounted with a third viewpoint object detecting unit 114D, and an object selection unit 107D. The vehicle D has the same functional units as the vehicle A shown in FIG. 6.

The third viewpoint object detecting unit 114D has a function of detecting the object presenting on the road in the viewpoint of the vehicle D.

The object selection unit 107D has a function of selecting the object in a priority area detected in the viewpoint of the vehicle D among objects presenting in the priority area set by the vehicle B, and transmitting the selected object information to the vehicle B. If the vehicle D extends (adds) the priority area, the object selection unit 107D also has a function of transmitting the object information of the extended priority area to the vehicle B.

The vehicle B is mounted with an area setting unit 106B, and an overlapped area adjusting unit 115B. The vehicle B also has other functional units shown in FIG. 6.

The area setting unit 106B has a function of setting, as the priority area, a monitoring area which is a predetermined blind spot area among a plurality of blind spot areas and which is set by the area correction unit 109B (not shown) in order to supplement, with another viewpoint information, a blind spot area where the object could not be detected within the sensor view angle of the vehicle B. However, setting of the priority area is performed based on area designation information in which a designated area to be monitored is set for each requested vehicle.

The overlapped area adjusting unit 115B is connected to the area setting unit 106B and the object selection units 107A and 107D. The overlapped area adjusting unit 115B has a function of comparing the pieces of object information transmitted from the object selection units 107A and 107D and determining whether the pieces of object information are identical and whether the areas of the pieces of object information are identical.

If the pieces of object information (areas) overlap each other, the overlapped area adjusting unit 115B obtains the center of gravity of an overlapped area, and based on a distance from each of the vehicles A to D to the center of gravity, the vehicle having the shorter distance to the center of gravity has a function of maintaining the area designation of the area designation information, and the vehicle having the longer distance to the center of gravity has a function of temporarily canceling the area designation. The overlapped area adjusting unit 115B has a function of continuously monitoring whether the pieces of object information are overlapped in the overlapped area, and returning the area designation of the area designation information to the initial value, if the object information is no longer present in the overlapped area.

[Information Processing Method]

Figure 14:
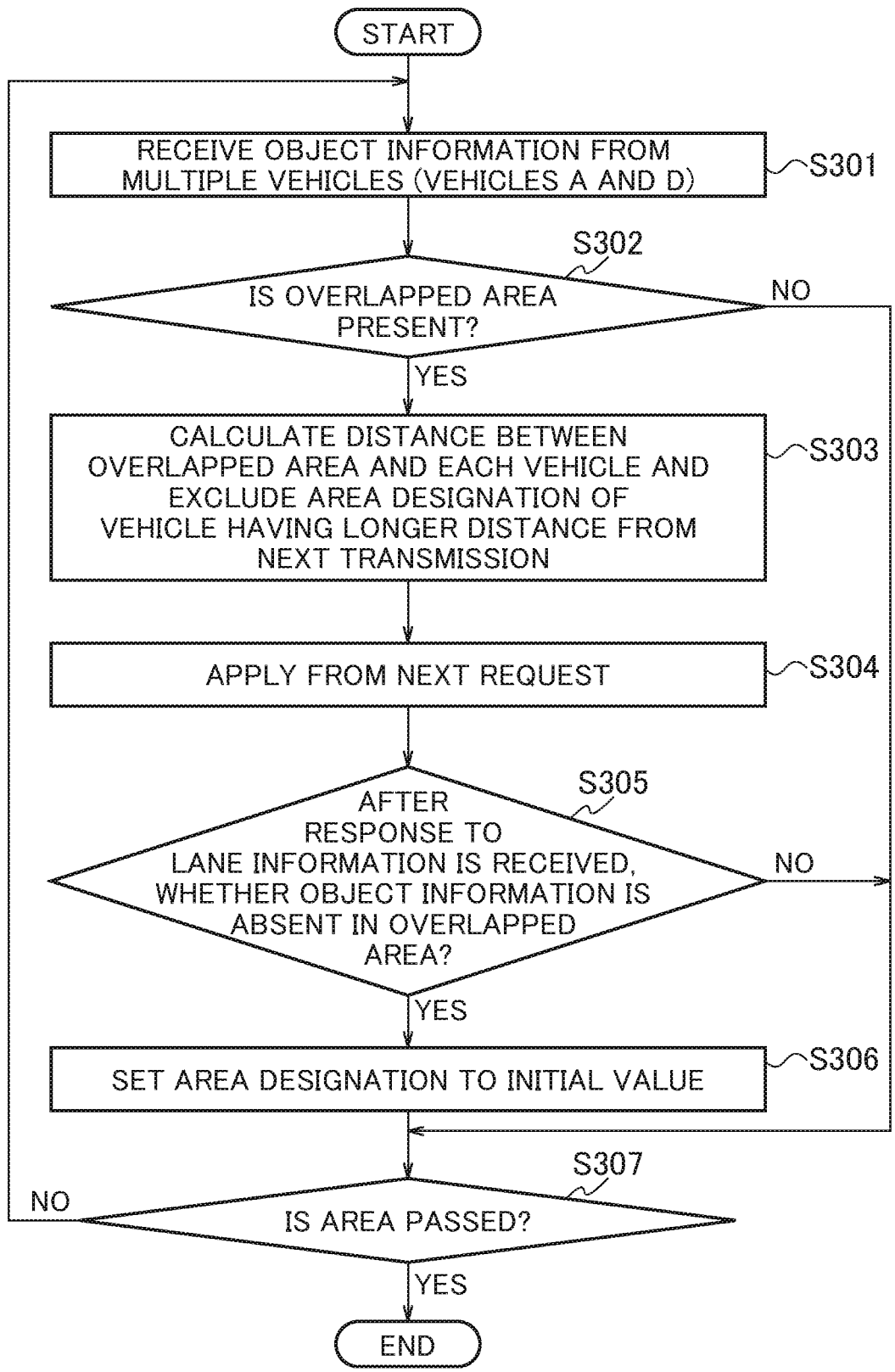
FIG. 14 is a flowchart showing process procedures of an information processing method.

Next, an information processing method performed by the information processing device 1 will be described. FIG. 14 is a flowchart showing process procedures in the information processing method.

Figure 15:
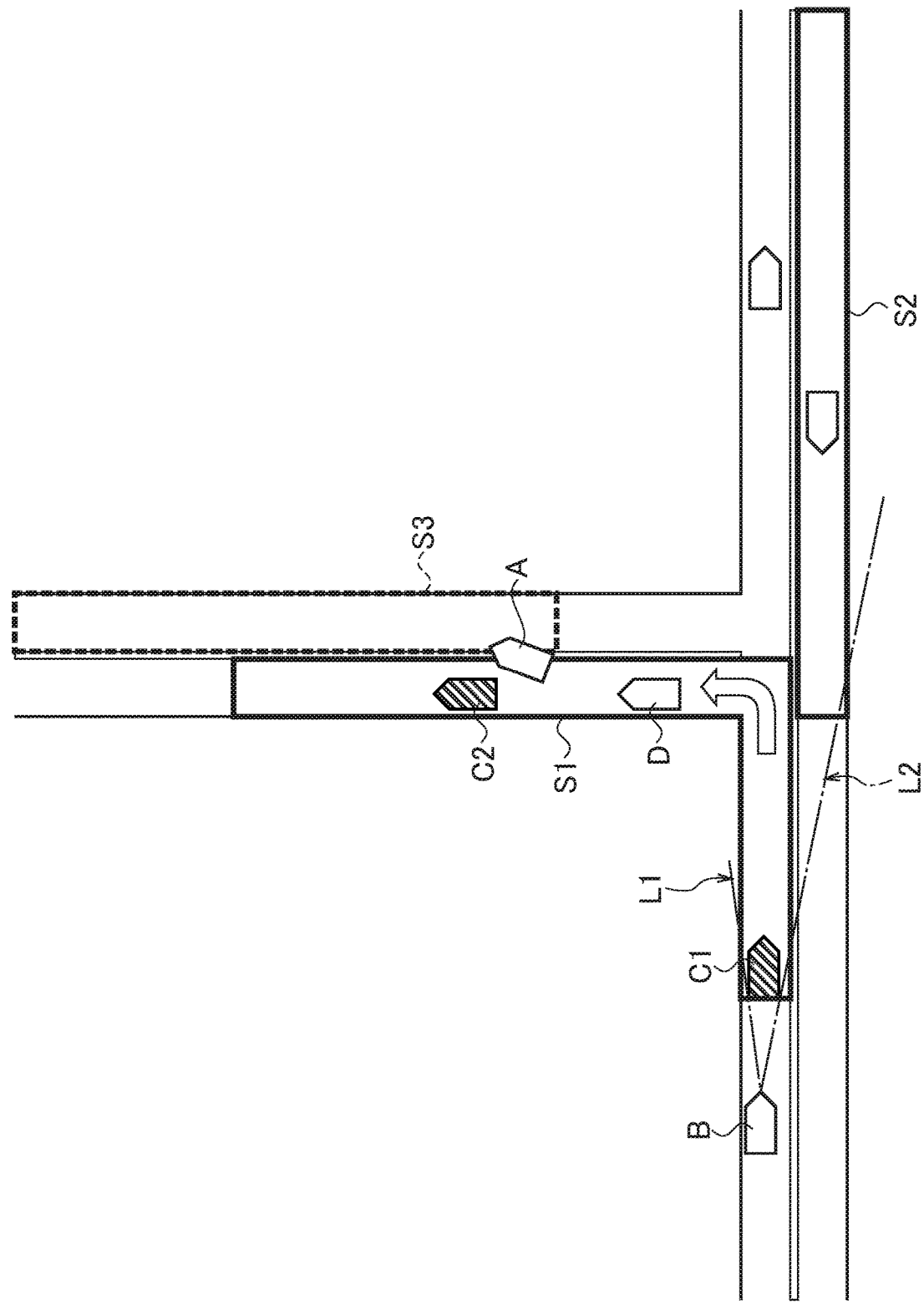
FIG. 15 is a supplementary view for explaining processes shown in FIG. 14.

First, preconditions will be described with reference to FIG. 15. The vehicle B receiving the object information and the vehicles A and D transmitting pieces of object information at the same time are present. Based on the second embodiment, three monitoring areas S1 to S3 are set.

Step S301;

First, the overlapped area adjusting unit 115B in the vehicle B receives the object information transmitted from the object selection unit 107A in the vehicle A and the object information transmitted from the object selection unit 107D in the vehicle D.

Figure 16:
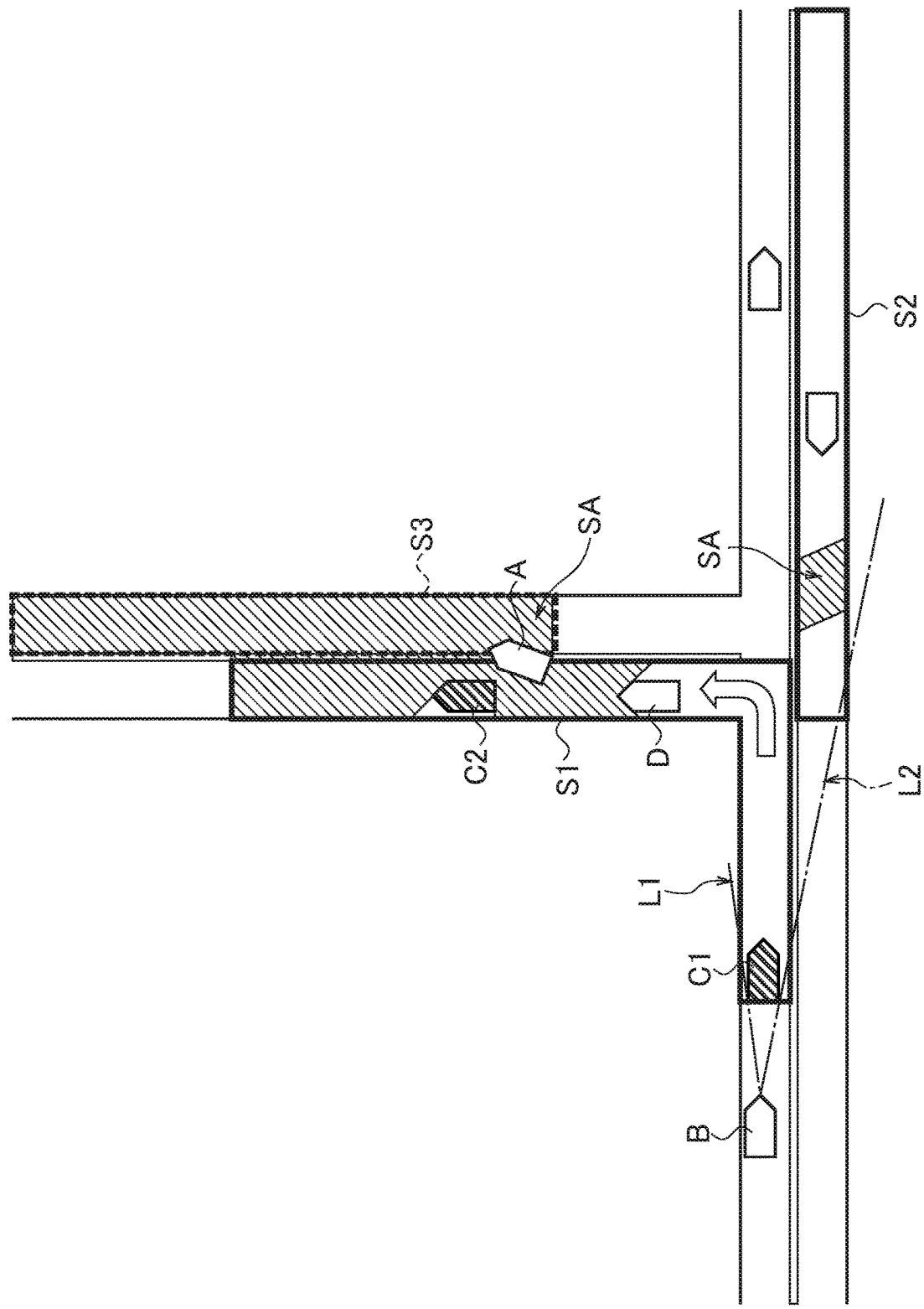
FIG. 16 is a supplementary view for explaining processes shown in FIG. 14.
Figure 17:
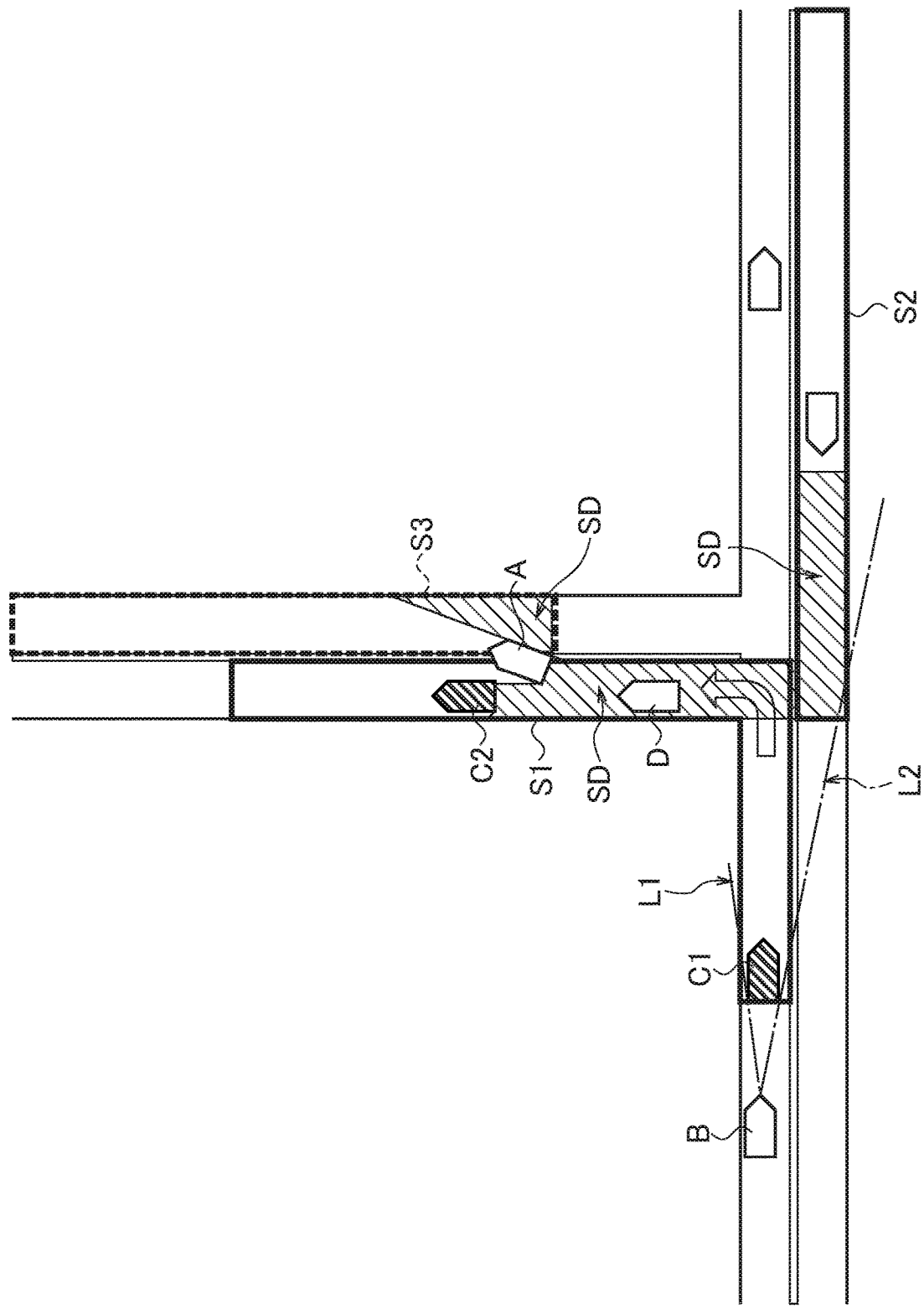
FIG. 17 is a supplementary view for explaining processes shown in FIG. 14.
Figure 18:
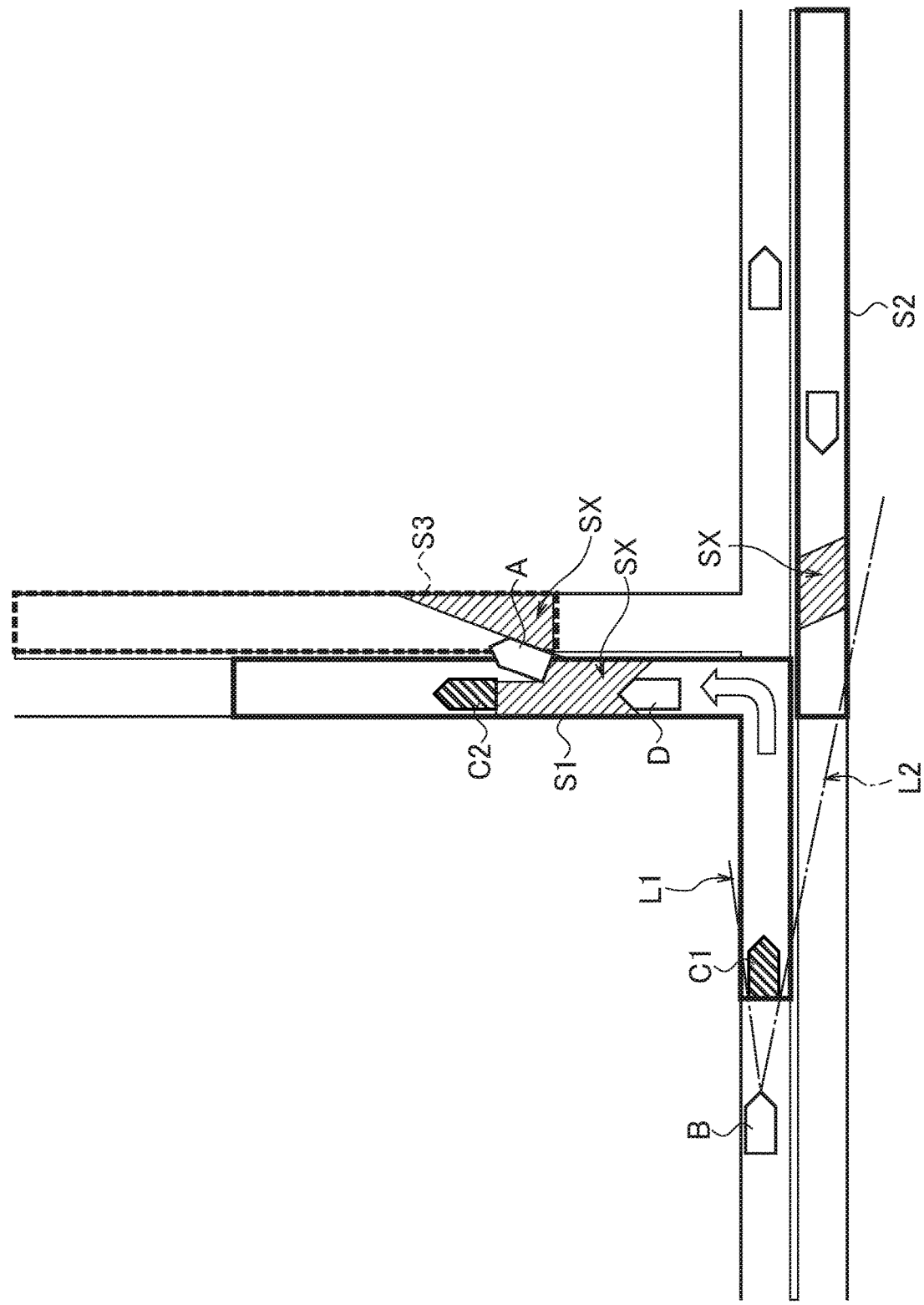
FIG. 18 is a supplementary view for explaining processes shown in FIG. 14.

Step S302;

Next, the overlapped area adjusting unit 115B compares positions, sizes, and the like of an area related to the object information from the object selection unit 107A and an area related to the object information from the object selection unit 107D. FIG. 16 shows how an initial setting area SA by the vehicle A is set, and FIG. 17 shows how an initial setting area SD by the vehicle D is set, and in this case, the overlapped area SX at which the area SA is overlapped with the area SD is as shown in FIG. 18. As a result of comparing the areas, if there is an overlapped area, the process proceeds to step S303, and alternatively if there is no overlapped area, the process proceeds to step S307.

Step S303;

If there is an overlapped area, the overlapped area adjusting unit 115B calculates the center of gravity of the overlapped area SX, and calculates a distances from each of the vehicles A and D to the center of gravity. Then, the overlapping area adjusting unit 115B excludes the vehicle having the longer distance from the center of gravity from the area designation in the next transmission.

Figure 19:
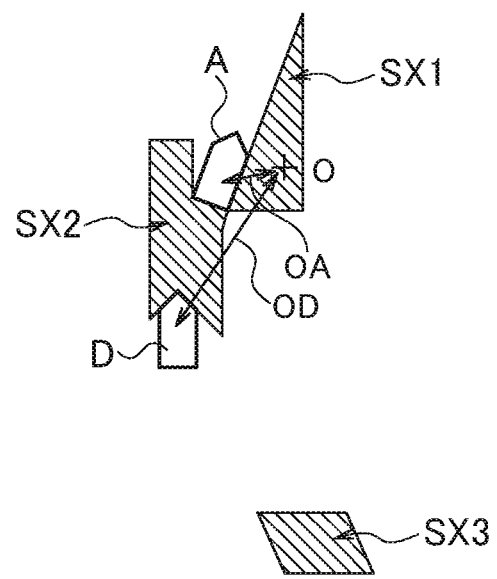
FIG. 19 is a supplementary view for explaining processes shown in FIG. 14.

For example, as shown in FIG. 19, if there is an overlapped area SX1 on the side of the vehicle A, the overlapped area adjusting unit 115B obtains the center of gravity O of the overlapped area SX1, and calculates a distance OA between the vehicle A and the center of gravity O, and a distance OD between the vehicle D and the center of gravity O. From the relation of the distance OA<distance OD, the overlapped area adjusting unit 115B determines that the vehicle A is more likely recognize the overlapped area SX1, and temporarily excludes the vehicle D from the designated range of the designated area.

The overlapped area SX2 is equidistant from each of the vehicles A and D. Therefore, the overlapped area adjusting unit 115B maintains area designation for the vehicle D which is closer to the host-vehicle (the vehicle B) and can perform stable communication, and cancels the designated area for the vehicle A. The designated area for the vehicle D closer to the center of gravity of the overlapped area SX3 is maintained, and the designated area for the vehicle A is cancelled.

Step S304;

Next, the area setting unit 106B applies the area designation of the monitoring area to be included in the request data based on the new designated area by the overlapped area adjusting unit 115B. For example, the overlapped area adjusting unit 115B changes the area designation information so as to include the overlapped area SX1 for the monitoring area requested to the vehicle A and not include the overlapped area SX1 for the monitoring area requested to the vehicle D.

Then, the area setting unit 106B transmits requests of the overlapped area SX1, for example, only to the vehicle A from the next time or thereafter based on the changed area designation information. Accordingly, the vehicle D does not receive the request of the object information of the overlapped area SX1 from the vehicle B, and therefore does not transmit the object information of the overlapped area SX1.

Step S305;

Thereafter, the overlapped area adjusting unit 115B receives the pieces of object information transmitted from the vehicles A and D individually, and continuously monitors whether the object information is present in the overlapped area. Then, the area setting unit 106B proceeds the process to step S306, if the object information is not able to be acquired in the overlapped area, and alternatively proceeds the process to step S307, if the object information can be continuously acquired in the overlapped area (in other words, if the object is continuously present in the overlapped area).

Step S306;

If the object information is absent in the overlapped area, the overlapped area adjusting unit 115B restores the area designation of the area designation information to the original state, in order to resume the transmission of the pieces of object information from both the vehicles A and D.

Step S307;

Finally, the vehicle B determines whether the vehicle A has passed the overlapped area, and if the vehicle A has not passed the overlapped area, the process proceeds to step S301, and alternatively if the vehicle A has passed the overlapped area, the processes are ended.

Effect of Third Embodiment

According to the present embodiment, if the individual areas requested to the vehicles A and D overlap, the overlapped area adjusting unit 115B maintains the area designation of the vehicle closer to the overlapped area and cancels the area designation of the vehicle farther from the overlapped area. Therefore, object information useful for the driver of the vehicle B and the automatic driving system can be acquired in a more accurate state. Further, the communication volume between vehicles can be reduced.

Another Example of Object Information and Request Data Shown in Second Embodiment Another Example of Request Data Transmitted from Vehicle B to Vehicle A The request data to be transmitted from the vehicle B to the vehicle A shown in Table 2 of the second embodiment may be realized by, for example, a data structure shown in Table 3 below.

TABLE 3

| | | |
|---|---|---|
| Header | 1. | Information on vehicle (vehicle B) as data creation subject |
| | (1) | Identification code of vehicle B |
| | (2) | Data for checking whether contents are present (basic message of vehicle B) |
| Content data | 1. | Area information storage area |
| | (1) | Request for object information in area |
| | | Request flag (present/absent), type of requested object data, request ID (generate and issue random number) |
| | | Sensor header (sensor ID, frame number, the number of frames transmitted, sensor type, update cycle, camera, visual axis, view angle, object recognition accuracy) |
| | | Content |
| | (a) | Object information |
| | | Position, traveling direction, speed, object type (vehicle (standard-sized vehicle, large-sized vehicle, two-wheal vehicle and the like), pedestrian, road obstacle, road structure and the like), size, height, stationary duration and the like |
| | (b) | Road structure information |
| | | Road width, lane width, number of lanes, road alignment, regulation information, and regulation vehicle speed information and the like |
| | (2) | Basic message of vehicle B |
| | | Observation time, current position and traveling direction, speed (may be in accordance with SAEJ2945/1BSM and the like) |
| | (3) | Area specifying information data |
| | | Area ID, area type flag (whether blind spot area is present/priority), area size, link ID, a group of node IDs for each link, node ID, node position information (GNSS coordinate), adjacent area ID, road ID and lane ID on area, map ID, version information and the like |
| | (4) | Area-specific correction information data (area fixed time release information by receiver) |
| | | Corrected area ID, correction vehicle ID, temporary release time zone information, as corrected area specifying information data, area type flag (whether blind spot area is present/priority), area size, link ID, a group of node IDs for each link, node ID, node position information (GNSS coordinate), adjacent area ID, road ID and lane ID on area, map ID, version information and the like |

Another Example of Object Information Transmitted from Vehicle a to Vehicle B

The object information transmitted from the vehicle A to the vehicle B shown in Table 1 of the second embodiment may be realized by, for example, a data structure shown in Table 4 below.

TABLE 4

| | | |
|---|---|---|
| Header | 1. | Identification code of vehicle (vehicle A) as data creation subject |
| | (1) | Identification code of vehicle A |
| | (2) | Data for checking whether contents are present (response information for request for object information in area, basic message of vehicle A, area specifying information data, area correction information data) |
| Content data | 1. | Area information storage area |
| | (1) | Response information for request for object information in area<br>Request response flag sub-header (present/absent), type of requested objectdata, a group of received request IDs<br>Sensor sub-header (sensor ID, frame number, the number of frames transmitted, sensor type, update cycle, camera, visual axis, view angle, object recognition accuracy)<br>Content |
| | (a) | Object information<br>Position, traveling direction, speed, object type<br>(vehicle (standard-sized vehicle, large-sized vehicle, two-wheel vehicle and the like), pedestrian, road obstacle, road structure and the like), size, height, stationary duration and the like |
| | (b) | Road structure information<br>Road width, lane width, number of lanes,<br>road alignment, regulation information, regulation vehicle speed information and the like |
| | (2) | Basic message of vehicle A<br>Observation time, current position and<br>traveling direction, and speed (may be in accordance with SAEJ2945/1BSM) |
| | (3) | Area specifying information data<br>Area ID, area type flag (whether<br>blind spot area is present/priority), area size, link ID, a group<br>of node IDs for each link, node ID, node position information<br>(GNSS coordinate), adjacent area ID, road ID and lane ID on area,<br>map ID, version information and the like |
| | (4) | Area-specific correction information data (additional correction by transmitting side)<br>Corrected area ID, correction vehicle ID<br>Correction factor flag (lane blockade, obstacle and the like),<br>as corrected area specifying information data, area type flag<br>(whether blind spot area is present/priority), area size,<br>link ID, a group of node IDs for each link, node ID, node position information (GNSS coordinate), adjacent area ID, road ID and lane ID on area, map ID, version information and the like |
| | (5) | Area specific correction information data (area fixed time release information by receiver)<br>Corrected area ID, correction vehicle ID<br>temporary release time zone information, as corrected area specifying information data, area type<br>flag (whether blind spot area is present/priority), area size,<br>link ID, a group of node IDs for each link, node ID, node position information (GNSS coordinate), adjacent area ID, road ID and lane ID on area, map ID, version information and the like |

REFERENCE SIGNS LIST

1 Information processing device
101 Sensor
102 Position measuring unit
103 First viewpoint object detecting unit
104 Second viewpoint object detecting unit
105 Object information collecting unit
106 Area setting unit
107 Object selection unit
108 Map/planned travel route information storage unit
109 Area correction unit
110 Communication unit
111 Map information storage unit
112 Object selection area correction unit
113 Communication unit
114 Third viewpoint object detecting unit
115 Overlapping area adjusting unit
116 Object communication unit
H101 Sensor device
H102 Position measuring device
H103 Communication device
H104 Arithmetic processing device

The invention claimed is:

1. An information processing device comprising:
a first communication unit including a processor that receives a non-detection area data, the non-detection area in which an object is not able to be detected in a first viewpoint by a sensor installed in a first moving body;
a selection unit including a second processor that selects a detection area in which the object becomes detectable in a second viewpoint at a detection time different from that of the first viewpoint by the sensor installed in the first moving body, wherein
the first communication unit is configured to obtain the detection area data and to trigger transmitting, in response to the object becoming detectable by the sensor installed in the first moving body, at least the detection area data to a second moving body or a server, the second moving body differing from the first moving body, the first moving body and the second moving body are vehicles;

a setting unit including a third processor that sets a predetermined area to be prioritized among an area where an object is not able to be detected as a priority area based on a detection result of detecting the object on a road; and a second communication unit including a fourth processor that transmits, to a requested vehicle, request data for requesting object information included in the priority area and receives, from the requested vehicle, the object information included in the priority area.

2. The information processing device according to claim 1, wherein the non-detection area is a non-detection area in which the object could not be detected by a sensor installed in the second moving body; and the first communication unit receives the non-detection area data from the second moving body, and transmits the detection area data based on the received non-detection area to the second moving body.

3. The information processing device according to claim 1, wherein the setting unit acquires future position information of a requesting vehicle requesting the object information, and sets an area where the requesting vehicle is not able to detect the object in the future as the priority area based on the future position information and the detection result.

4. The information processing device according to claim 1 comprising:

a memory that stores map information, wherein the setting unit sets the priority area based on a lane link ID on a map by using the map information.

5. The information processing device according to claim 1, wherein the priority area is an area based on a boundary based on a predetermined object detected by the requested vehicle at least at a predetermined timing.

6. The information processing device according to claim 5, wherein the predetermined object is a white line or a vehicle on the road.

7. The information processing device according to claim 1, wherein the setting unit sets a temporary shielded area where the object is not able to be detected in the first viewpoint and the object can be detected in the second viewpoint, based on the detection result; and the second communication unit transmits the temporary shielded area to any one of the requested vehicle, a vehicle other than the requested vehicle, and a server.

8. The information processing device according to claim 1, wherein the request data includes information on a position and a planned travel route of the requesting vehicle requesting the object information, in addition to information on the priority area.

9. The information processing device according to claim 1, wherein the setting unit sets an area with a predetermined road shape as the priority area.

10. The information processing device according to claim 9, wherein the predetermined road shape is any one of an intersection, a curve, and a curve gradient inflection point.

11. The information processing device according to claim 1, wherein the object information includes object information detected in an area different from the priority area or object information detectable in the future in an area different from the priority area, in addition to the object information detected in the priority area by the requested vehicle.

12. The information processing device according to claim 1, wherein the object information includes vehicle information or position information of an obstacle on the road detected by the requested vehicle.

13. The information processing device according to claim 1, wherein the requested vehicle includes a sensor that monitors a side of the road, and the requested vehicle detects a vehicle or an obstacle by detecting a road boundary line or a background object, detecting an object on the road, and determining an intersecting point between the detected object and a parting line.

14. The information processing device according to claim 1, wherein the information processing device is provided in the vehicle.

15. The information processing device according to claim 1, wherein the selection unit selects object information included in the priority area among object information on the road detected by the requested vehicle, the priority area being set by the setting unit of a requesting vehicle, and the first communication unit receives the request data from the second communication unit of the requesting vehicle and transmits, to the second communication unit of the requesting vehicle, the object information included in the priority area selected by the selection unit.

16. The information processing device according to claim 15, wherein if the requested vehicle is not able to travel in the priority area, the selection unit selects an area adjacent to the priority area as an extension area, and the first communication unit transmits, to the requesting vehicle, object information detected in the extension area in addition to the object information included in the priority area.

17. An information processing method performed by an information processing device, comprising the steps of:

receiving a non-detection area data, the non-detection area in which an object is not able to be detected in a first viewpoint by a sensor installed in a first moving body, selecting a detection area in which the object becomes detectable in a second viewpoint at a detection time different from that of the first viewpoint by the sensor installed in the first moving body;

obtaining the detection area data and triggering transmitting, in response to the object becoming detectable by the sensor installed in the first moving body, at least the detection area data to a second moving body or a server, the second moving body differs from the first moving body, wherein the first moving body and the second moving body are vehicles;

before the receiving step,
  setting a predetermined area to be prioritized among an area where an object is not able to be detected as a priority area based on a detection result of detecting the object on a road;
  transmitting, to a requested vehicle, request data for requesting object information included in the priority area; and
  after the transmitting step, receiving the object information included in the priority area from the requested vehicle.

18. The information processing method according to claim 17, wherein
  the non-detection area is a non-detection area in which the object could not be detected by a sensor installed in the second moving body; and
  in the transmitting step, receive the non-detection area data from the second moving body, and transmits the detection area data based on the received non-detection area to the second moving body.

19. The information processing method according to claim 17, wherein
  the receiving step includes receiving, from a requesting vehicle, the request data for requesting object information included in the priority area, the priority area being set by the requesting vehicle
  the selecting step includes selecting object information included in the priority area among object information on the road detected by the requested vehicle; and
  the transmitting step, includes transmitting, to the requesting vehicle, the object information included in the priority area.

20. A non-transitory recording medium storing an information processing program for causing an information processing device to perform the procedures of:
  receiving a non-detection area data, the non-detection area in which an object is not able to be detected in a first viewpoint by a sensor installed in a first moving body;
  selecting a detection area in which the object becomes detectable in a second viewpoint at a detection time different from that of the first viewpoint by the sensor installed in the first moving body;
  obtaining the detection area data and triggering transmitting, in response to the object becoming detectable by the sensor installed in the first moving body, at least the detection area data to a second moving body or a server, the second moving body differs from the first moving body,
  wherein the first moving body and the second moving body are vehicles;
  before the receiving procedure,
    setting a predetermined area to be prioritized among an area where an object is not able to be detected as a priority area based on a detection result of detecting the object on a road;
    transmitting, to a requested vehicle, request data for requesting object information included in the priority area; and
  after the transmitting procedure, receiving the object information included in the priority area from the requested vehicle.

21. The non-transitory recording medium according to claim 20, wherein
  the non-detection area is a non-detection area in which the object could not be detected by a sensor installed in the second moving body; and
  in the transmitting procedure, receive the non-detection area data from the second moving body, and transmits the detection area data based on the received non-detection area to the second moving body.

22. The non-transitory recording medium according to claim 20, wherein
  the receiving procedure includes receiving, from a requesting vehicle, the request data for requesting object information included in the priority area, the priority area being set by the requesting vehicle,
  the selecting procedure includes selecting object information included in the priority area among object information on the road detected by the requested vehicle, and
  the transmitting procedure includes transmitting, to the requesting vehicle, the object information included in the priority area.

23. The information processing device according to claim 1, wherein
  the second communication unit receives in advance, from the requested vehicle, distribution order information set with a distribution order in which the priority area is prioritized over an extension area of the priority area adjacent to the priority area, and receives, from the requested vehicle, the object information included in the priority area and object information included in the extension area in the distribution order set in the distribution order information.

24. The information processing device according to claim 15, wherein
  the first communication unit transmits in advance, to the requesting vehicle, distribution order information set with a distribution order in which the priority area is prioritized over the extension area of the priority area adjacent to the priority area, and transmits, to the requesting vehicle, the object information included in the priority area and the object information included in the extension area in the distribution order set in the distribution order information.

25. The information processing method according to claim 17, wherein
  in the object information receiving step,
  distribution order information set with a distribution order in which the priority area is prioritized over an extension area of the priority area adjacent to the priority area is received in advance, from the requested vehicle, and the object information included in the priority area and object information included in the extension area are received from the requested vehicle in the distribution order set in the distribution order information.

26. The information processing method according to claim 19, wherein
  in the transmitting step,
  distribution order information set with a distribution order in which the priority area is prioritized over an extension area of the priority area adjacent to the priority area is transmitted in advance to the requesting vehicle and the object information included in the priority area and object information included in the extension area are transmitted to the requesting vehicle in the distribution order set in the distribution order information.

27. The non-transitory recording medium according to claim 20, wherein
  in the object information receiving procedure,
  distribution order information set with a distribution order in which the priority area is prioritized over an extension area of the priority area adjacent to the priority area is received in advance from the requested vehicle, and the object information included in the priority area and object information included in the extension area are received from the requested vehicle in the distribution order set in the distribution order information.

28. The non-transitory recording medium according to claim 22, wherein in the transmitting procedure, distribution order information set with a distribution order in which the priority area is prioritized over an extension area of the priority area adjacent to the priority area is transmitted in advance to the requesting vehicle, and the object information included in the priority area and object information included in the extension area are transmitted to the requesting vehicle in the distribution order set in the distribution order information.

\* \* \* \* \*